(12) United States Patent
Yokoyama et al.

(10) Patent No.: US 9,372,034 B2
(45) Date of Patent: Jun. 21, 2016

(54) COOL-STORAGE TYPE HEAT EXCHANGER

(75) Inventors: Naoki Yokoyama, Chiryu (JP); Yoshio Miyata, Nagoya (JP); Etsuo Hasegawa, Nagoya (JP); Masahiro Shimoya, Kariya (JP); Jun Abei, Obu (JP); Ryoichi Sanada, Obu (JP); Takashi Andoh, Chiryu (JP); Seiji Inoue, Nukata (JP); Katsutoshi Enomoto, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 400 days.

(21) Appl. No.: 12/584,843

(22) Filed: Sep. 11, 2009

(65) Prior Publication Data

US 2010/0065244 A1 Mar. 18, 2010

(30) Foreign Application Priority Data

Sep. 12, 2008 (JP) .................................. 2008-235408
Mar. 26, 2009 (JP) .................................. 2009-077144

(51) Int. Cl.
*F28D 17/00* (2006.01)
*F28D 20/00* (2006.01)
(Continued)

(52) U.S. Cl.
CPC ................ *F28D 20/00* (2013.01); *B60H 1/005* (2013.01); *F28D 1/05383* (2013.01);
(Continued)

(58) Field of Classification Search
CPC .................... F28D 1/05383; F28D 2020/0013; F28D 20/02; F28D 2020/0026; B60H 1/005
USPC ................................................ 165/10, 41, 42
See application file for complete search history.

(56) References Cited

U.S. PATENT DOCUMENTS 4,723,601 A * 2/1988 Ohara et al. ................... 165/153
5,239,839 A * 8/1993 James .............................. 62/434
(Continued)

FOREIGN PATENT DOCUMENTS

DE 102004035818 3/2006
JP U H01-129587 9/1989
(Continued)

OTHER PUBLICATIONS

Rejection Decision issued in the corresponding Chinese patent application No. 2010 1013 4266.7 on Feb. 22, 2012 with English translation thereof.

(Continued)

*Primary Examiner* — Marc Norman
*Assistant Examiner* — David Teitelbaum
(74) *Attorney, Agent, or Firm* — Harness, Dickey & Pierce, P.L.C.

(57) ABSTRACT

An object of the invention is to provide an effective cooling-energy storing performance and a stable cooling-energy radiating performance and to realize a high productivity. An evaporator has a plurality of refrigerant tubes arranged at almost equal intervals to form therebetween accommodating spaces. A plurality of cooling-storage containers are arranged in some of the accommodating spaces and fins are arranged in the remaining accommodating spaces. A cooling-storage unit is formed by one cooling-storage container and two refrigerant tubes arranged at both sides of the cooling-storage container. Each of the cooling-storage container has projections extending from one wall portion to the other wall portion to form heat exchange portions. The cooling-storage container is connected to the refrigerant tubes by soldering material.

29 Claims, 23 Drawing Sheets

(51) Int. Cl.
  *F28D 1/053*  (2006.01)
  *F28D 20/02*  (2006.01)
  *B60H 1/00*  (2006.01)
  *F28D 21/00*  (2006.01)

(52) U.S. Cl.
  CPC ....... *F28D 20/02* (2013.01); *F28D 2020/0013* (2013.01); *F28D 2021/0071* (2013.01); *F28F 2275/04* (2013.01); *Y02E 60/142* (2013.01); *Y02E 60/145* (2013.01)

(56) References Cited

U.S. PATENT DOCUMENTS

| | | | | |
|---|---|---|---|---|
| 5,531,268 | A * | 7/1996 | Hoshino et al. | 165/153 |
| 6,101,830 | A * | 8/2000 | Feuerecker | 62/304 |
| 7,156,156 | B2 * | 1/2007 | Haller et al. | 165/10 |
| 2002/0088246 | A1 * | 7/2002 | Bureau et al. | 62/434 |
| 2002/0088248 | A1 | 7/2002 | Bureau et al. | |
| 2004/0093889 | A1 | 5/2004 | Bureau et al. | |
| 2004/0104020 | A1 | 6/2004 | Haller et al. | |
| 2005/0166632 | A1 | 8/2005 | Bureau et al. | |
| 2007/0068650 | A1 | 3/2007 | Haller et al. | |
| 2007/0215331 | A1 * | 9/2007 | Higashiyama et al. | 165/167 |
| 2010/0243223 | A1 | 9/2010 | Lim et al. | |

FOREIGN PATENT DOCUMENTS

| | | | |
|---|---|---|---|
| JP | 08-175167 | | 7/1996 |
| JP | 2000-205777 | * | 7/2000 |
| JP | 2001-107035 | | 4/2001 |
| JP | 2002-225536 | | 8/2002 |
| JP | 2002-274165 | | 9/2002 |
| JP | 2004-184071 | | 7/2004 |
| KR | 10-2008-0026738 | | 3/2008 |
| KR | 10-2009-0023901 | | 3/2009 |

OTHER PUBLICATIONS

Office action dated Dec. 20, 2011 in corresponding Korean Application No. 10-2010-0021529.

Office Action dated Jun. 27, 2011 in counterpart Chinese application No. 201010134266.7 (with English translation).

Reexamination Notification issued May 24, 2013 in corresponding Chinese Application No. 2010 1013 4266.7. (with English translation).

Office action dated Jul. 9, 2013 in corresponding Japanese Application No. 2009-077144 with English translation.

Office Action mailed Dec. 3, 2015 in corresponding Chinese Application No. 2014 1027 2921.3 (with English translation).

\* cited by examiner

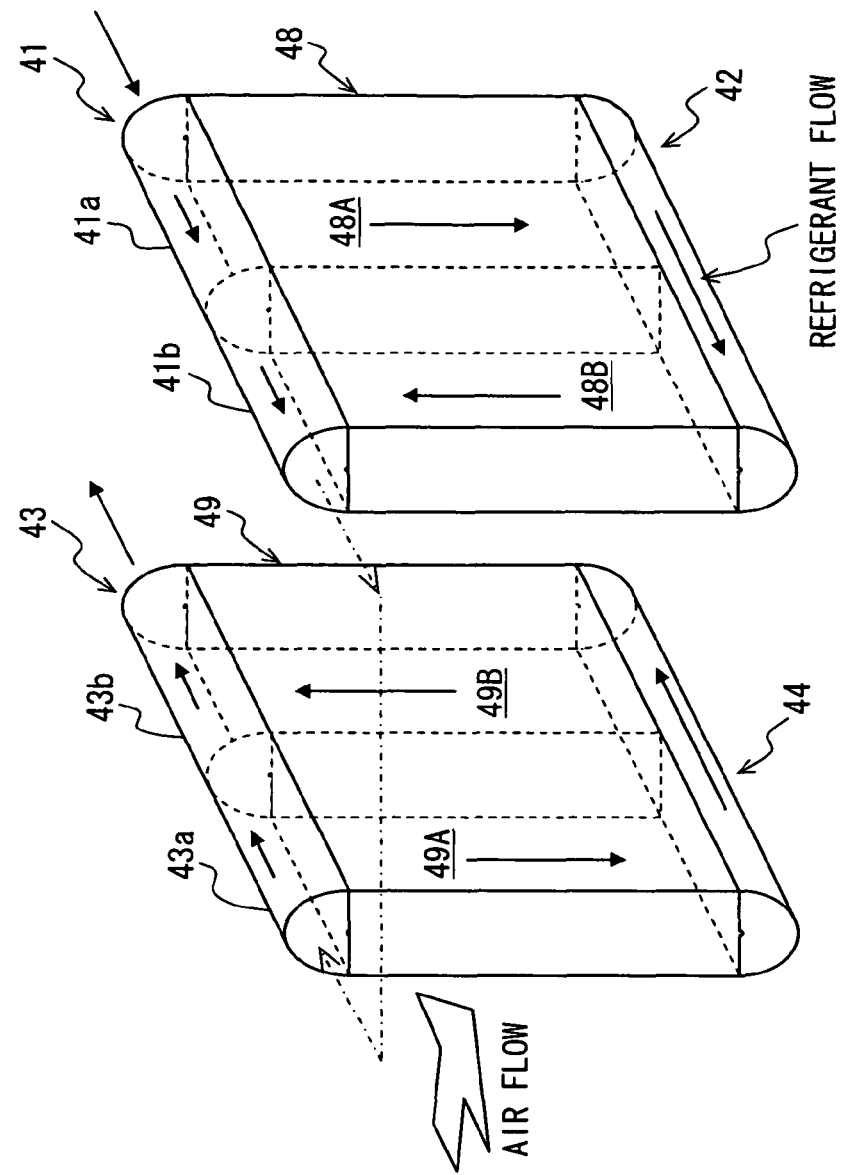
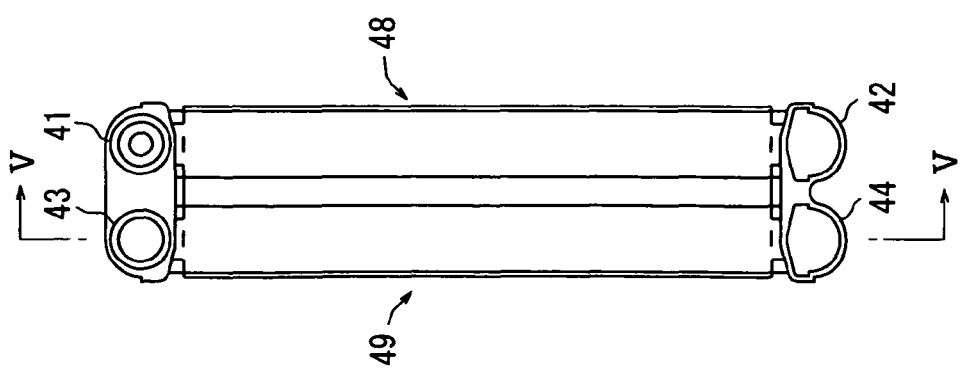

AIR FLOW

REFRIGERANT FLOW

COOL-STORAGE TYPE HEAT EXCHANGER

CROSS REFERENCE TO RELATED APPLICATION

This application is based on Japanese Patent Applications No. 2008-235408 filed on Sep. 12, 2008 and No. 2009-77144 filed on Mar. 26, 2009, the disclosures of which are incorporated herein by reference.

FIELD OF THE INVENTION

The present invention relates to a cool-storage type heat exchanger to be used in a refrigerating cycle.

BACKGROUND OF THE INVENTION

A refrigerating-cycle is used for an air-conditioning apparatus. Many proposals have been made, according to which a cooling operation is carried out, although it may be a limited operation, even when an operation of the refrigerating cycle is stopped. For example, in case of the air-conditioning apparatus for a vehicle, the refrigerating cycle is operated by an engine for driving the vehicle. Therefore, when the engine operation is temporarily stopped during the vehicle is brought to a stop, the operation of the refrigerating cycle is likewise stopped. According to one of ideas, a cool-storage type heat exchanger, in which a cooling-storage device is attached to the heat exchanger, is used in the refrigerating cycle in order to provide the cooling operation even during the temporary stop of the vehicle (that is, during the temporary engine stop).

For example, the following prior arts (patent literatures) are known in the art:
(1) Japanese Patent Publication No. 2004-184071
(2) Japanese Patent Publication No. 2002-274165
(3) Japanese Patent Publication (PCT) No. 2006-503253
(4) Japanese Patent Publication No. 2002-225536
(5) Japanese Patent Publication No. 2001-107035

According to disclosures of the above patent literatures (1) and (2), refrigerant tubes are formed at one side of a cooling-storage device and fins for heat exchanging with air are formed at the other side thereof. According to the above structure, the cooling-storage device is cooled down only from one side thereof. Therefore, there is concern that the cooling-storage device may not be sufficiently cooled down. On the other hand, the air is directly heat exchanged with the cooling-storage device at the other side thereof. When the air having high temperature comes in contact with the cooling-storage device, the stored cooling-energy is quickly carried away. As above, it is difficult in the prior arts to efficiently cool down the cooling-storage device and to stably radiate the stored cooling-energy.

According to disclosures of the above patent literatures (3) and (4), a cooling-storage device is provided at a part of a heat exchanger. The stored cooling-energy moves to fins through refrigerant tubes along longitudinal direction of the refrigerant tubes. Therefore, it is difficult to obtain a high cooling capability. Furthermore, since a cooling-storage material and a fin are arranged between neighboring refrigerant tubes, a high productivity may not be achieved.

According to the above patent literature (5), cooling-storage elements are provided in place of fins for a heat exchanger. According to such a structure, however, a high productivity may not be likewise achieved, because a plurality of cooling-storage cells is arranged between the refrigerant tubes.

SUMMARY OF THE INVENTION

The present invention is made in view of the above problems. It is an object of the present invention to provide a cool-storage type heat exchanger, according to which it is capable of efficiently storing cooling-energy and stably radiating the stored cooling-energy.

It is a further object of the present invention to provide a cool-storage type heat exchanger, according to which a high productivity can be realized.

The present invention has one of or a combination of the following features:

According to a feature of the invention, a cool-storage type heat exchanger has a first and a second header tanks, and a plurality of refrigerant tubes arranged at distances and between the first and second header tanks, so that refrigerant flows through the refrigerant tubes at least from one of the first and second header tanks to the other header tank.

The heat exchanger further has a cooling-storage container arranged in an accommodating space formed between neighboring refrigerant tubes and thermally connected to the refrigerant tubes, a cooling-storage material inserted into an inside of the cooling-storage container, and a heat exchange portion provided in the cooling-storage container and projecting into the inside of the cooling-storage container.

In the above heat exchanger, accommodating spaces formed between neighboring refrigerant tubes and at both sides of the cooling-storage container are formed as air passages, through which air passes for heat exchanging with the refrigerant flowing through the refrigerant tubes.

According to the above heat exchanger, the cooling-storage material can be effectively cooled down by the refrigerant tubes arranged at both sides of the cooling-storage container, so that an effective cooling-energy storing operation can be realized. The refrigerant tube exists between the cooling-storage container and the air passage, so that the cooling-energy is stably radiated from the cooling-storage material to the air passage.

Furthermore, the cooling-storage container has the heat exchange portion provided in the cooling-storage container and projecting into the inside of the cooling-storage container. As a result, the cooling-energy storing as well as the cooling-energy radiating operation can be effectively carried out. In addition, since the cooling-storage container is connected to the refrigerant tubes, not only a higher mechanical strength but also a higher heat transfer can be obtained.

According to another feature of the invention, a plurality of fins are provided in the accommodating spaces for the air passages, so that heat exchange between the cooling-storage material and the air passing though the air passages can be facilitated.

According to a further feature of the invention, the refrigerant tubes are arranged at equal intervals, and a width of the cooling-storage container is substantially equal to that of the air passage. According to such a structure, the air passage and the cooling-storage container can be exchanged with each other, so that flexibility for deciding a number of as well as a position of the cooling-storage containers in the heat exchanger can be increased.

According to a still further feature of the invention, a ratio of the cooling-storage container occupying the accommodating spaces formed between the refrigerant tubes is a value between 10% and 50% of a total space of the accommodating spaces formed between the refrigerant tubes. According to such feature, a cooling-energy storing performance as well as a cooling-energy radiating performance can be properly maintained.

According to a still further feature of the invention, the cooling-storage container is connected to the refrigerant tubes by soldering material. According to such feature, the heat transfer between the refrigerant tubes and the cooling-storage containers can be increased by the soldering material. In addition, the same soldering material for connecting the fins with the refrigerant tubes as well as the same soldering oven can be commonly used for connecting the cooling-storage containers to the refrigerant tubes.

According to a still further feature of the invention, the cooling-storage container is composed of a pair of main wall portions and a plurality of partitioning portions, wherein each of the partitioning walls extends from one of the wall portions to the other wall portion. The container of this kind is known as a multi-passage pipe, which is manufactured by an extrusion working.

According to a still further feature of the invention, the heat exchange portion is formed by an inner fin provided in the cooling storage container. According to such feature, the heat exchange portion can be provided by the inner fin, which is easily manufactured.

According to a still further feature of the invention, the heat exchange portion is formed by projections, each of which projects from one of wall portions of the cooling-storage container toward the other wall portion. According to such feature, the cooling-storage container can be manufactured with less number of parts.

According to a still further feature of the invention, a plurality of cooling-storage containers are arranged at equal intervals, so that temperature distribution can be avoided.

According to a still further feature of the invention, a plurality of cooling-storage containers are equally arranged on right and left sides of the heat exchanger with respect to a center thereof, so that temperature difference between right and left sides of the heat exchanger can be avoided.

According to a still further feature of the invention, a plurality of cooling-storage containers are symmetrically arranged with respect to the center of the heat exchanger. According to such feature, temperature distribution may become symmetric for right and left sides of the heat exchanger.

According to a still further feature of the invention, a heat exchanging area, which is formed by the refrigerant tubes, the cooling storage container and the air passages, is communicated with a single air-flow passage formed in an air conditioning case at a downstream side of the heat exchanger. According to such feature, the air flowing through the single air-flow passage can be cooled down by the heat exchanging area of the evaporator.

According to a still further feature of the invention a heat exchanging area, which is formed by the refrigerant tubes, the cooling storage container and the air passages, is divided into two heat exchanging areas, and each of heat exchanging areas is communicated with respective air-flow passages formed in an air conditioning case at a downstream side of the heat exchanger. According to such feature, the air flowing through different air-flow passages can be separately cooled down by the respective heat exchanging areas.

According to a still further feature of the invention, the heat exchanger comprises two-layered first and second heat exchanger portions, one cooling-storage container and two refrigerant tubes arranged at both sides of the cooling-storage container form a first cooling-storage unit, which is arranged in the first heat exchanger portion, and another cooling-storage container and other two refrigerant tubes arranged at both sides of the other cooling-storage container form a second cooling-storage unit, which is arranged in the second heat exchanger portion.

The first and second cooling-storage units are aligned with each other in a direction of air flow passing through the heat exchanger and the first and second cooling-storage units are separated from each other to form therebetween a space working as a heat insulating means.

According to such feature, even in the case that temperature difference appears between the first and second cooling-storage units, decrease of the cooling-energy storing performance as well as the cooling-energy radiating performance for the two cooling-storage units can be suppressed.

According to a still further feature of the invention, the heat exchanger comprises two-layered first and second heat exchanger portions, one cooling-storage container and two refrigerant tubes arranged at both sides of the cooling-storage container form a first cooling-storage unit, which is arranged in the first heat exchanger portion, and another cooling-storage container and other two refrigerant tubes arranged at both sides of the other cooling-storage container form a second cooling-storage unit, which is arranged in the second heat exchanger portion.

The first and second cooling-storage units are aligned with each other in a direction of air flow passing through the heat exchanger, and the first and second cooling-storage units are connected with each other by means of a partitioning wall or a restricted portion, which works as a heat insulating means.

According to such feature, even in the case that temperature difference appears between the first and second cooling-storage units, decrease of the cooling-energy storing performance as well as the cooling-energy radiating performance for the two cooling-storage units can be likewise suppressed.

BRIEF DESCRIPTION OF THE DRAWINGS

The above and other objects, features and advantages of the present invention will become more apparent from the following detailed description made with reference to the accompanying drawings. In the drawings:

FIG. 3A is a side view showing the heat exchanger according to the first embodiment;

FIG. 3B is a schematic perspective view of the heat exchanger showing refrigerant flow in the heat exchanger;

DETAILED DESCRIPTION OF THE PREFERRED EMBODIMENTS (First Embodiment)

Figure 1:
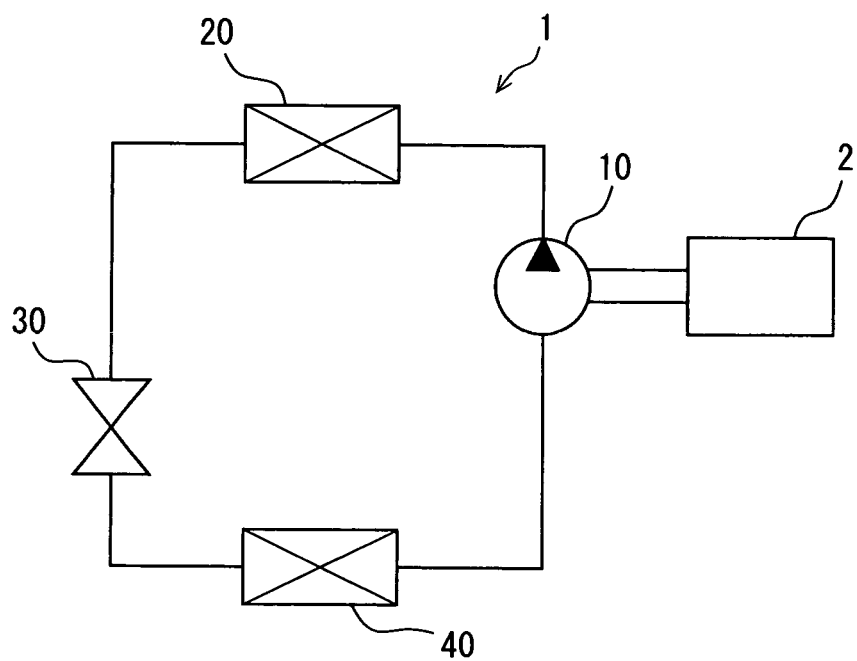
FIG. 1 is a schematic block diagram showing a refrigerating cycle according to a first embodiment of the present invention.

FIG. 1 is a schematic block diagram showing a refrigerating cycle 1 according to a first embodiment of the present invention. The refrigerating cycle 1 is used for an air conditioning apparatus for a vehicle. The refrigerating cycle 1 has a compressor 10, a heat radiating device 20, a depressurizing device 30, and a heat exchanger (an evaporator) 40. Those components are connected by refrigerant pipes in a closed circuit, so that refrigerant is circulated in the closed circuit. The compressor 10 is operated by a driving source 2, which is an internal combustion engine for driving the vehicle. Therefore, when the driving source 2 is stopped, the operation of the compressor 10 is also stopped. The compressor 10 draws the refrigerant from the evaporator 40, compresses the same and discharges the compressed refrigerant to the heat radiating device 20. The heat radiating device 20 cools down the high temperature refrigerant. The heat radiating device 20 is also referred to as a condenser. The depressurizing device 30 depressurizes the refrigerant cooled down by the condenser 20. The depressurizing device 30 may be composed of a fixed orifice, an expansion valve of a temperature depending type, or an ejector. The evaporator 40 vaporizes the refrigerant depressurized by the depressurizing device 30 to cool down air passing through the evaporator 40, so that the cooled-down air is supplied into a passenger compartment of the vehicle. The refrigerating cycle may further have an internal heat exchanger for heat exchanging between high-pressure side refrigerant and low-pressure side refrigerant, and a tank, such as a receiver or an accumulator, for storing excessive amount of the refrigerant. The vehicle driving source 2 may be composed of the internal combustion engine or an electric motor.

Figure 2:
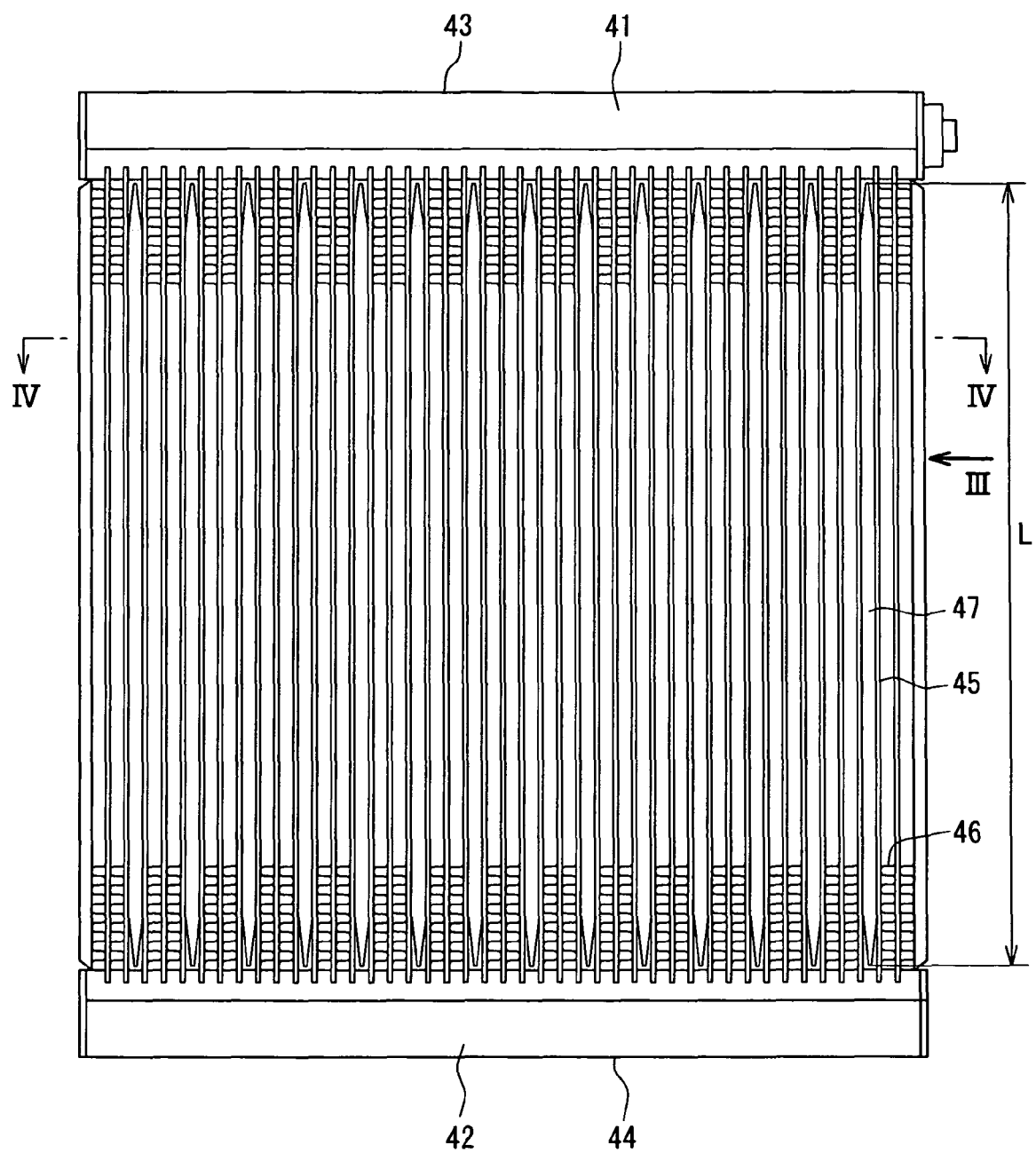
FIG. 2 is a plan view showing a heat exchanger according to the first embodiment.
Figure 4:
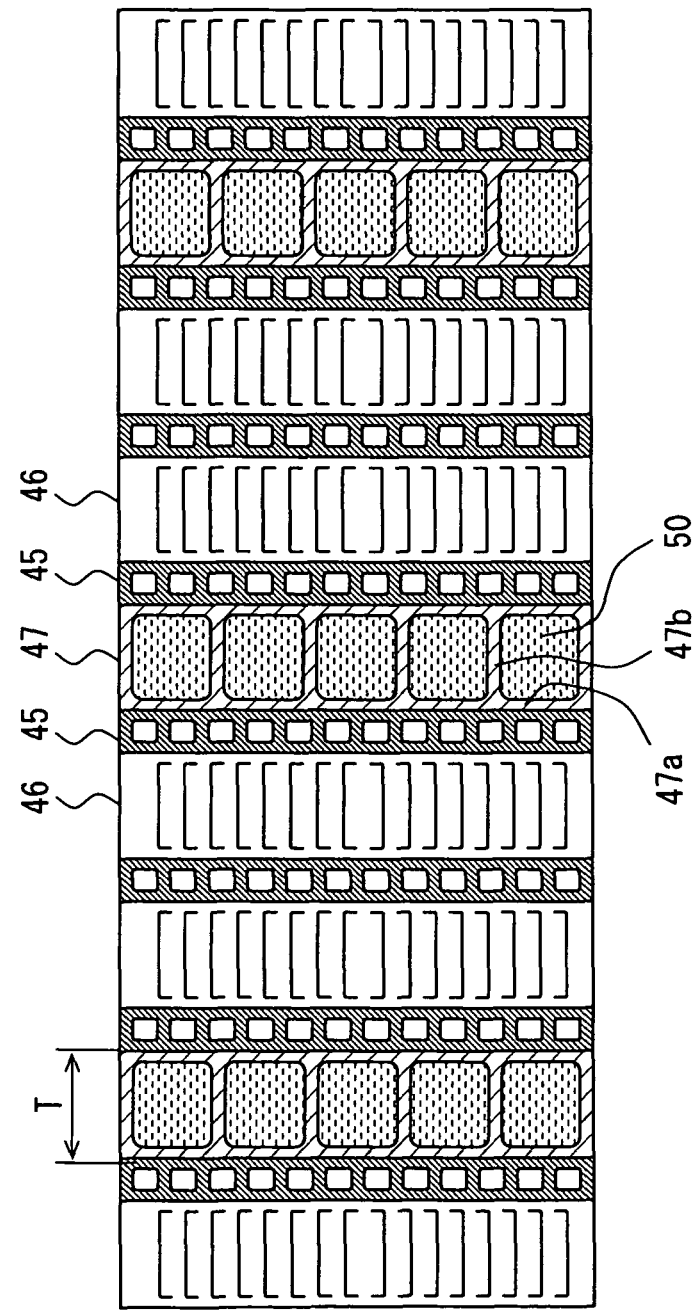
FIG. 4 is an enlarged partial view showing a transverse cross section taken along a line IV-IV of FIG. 2.
Figure 5:
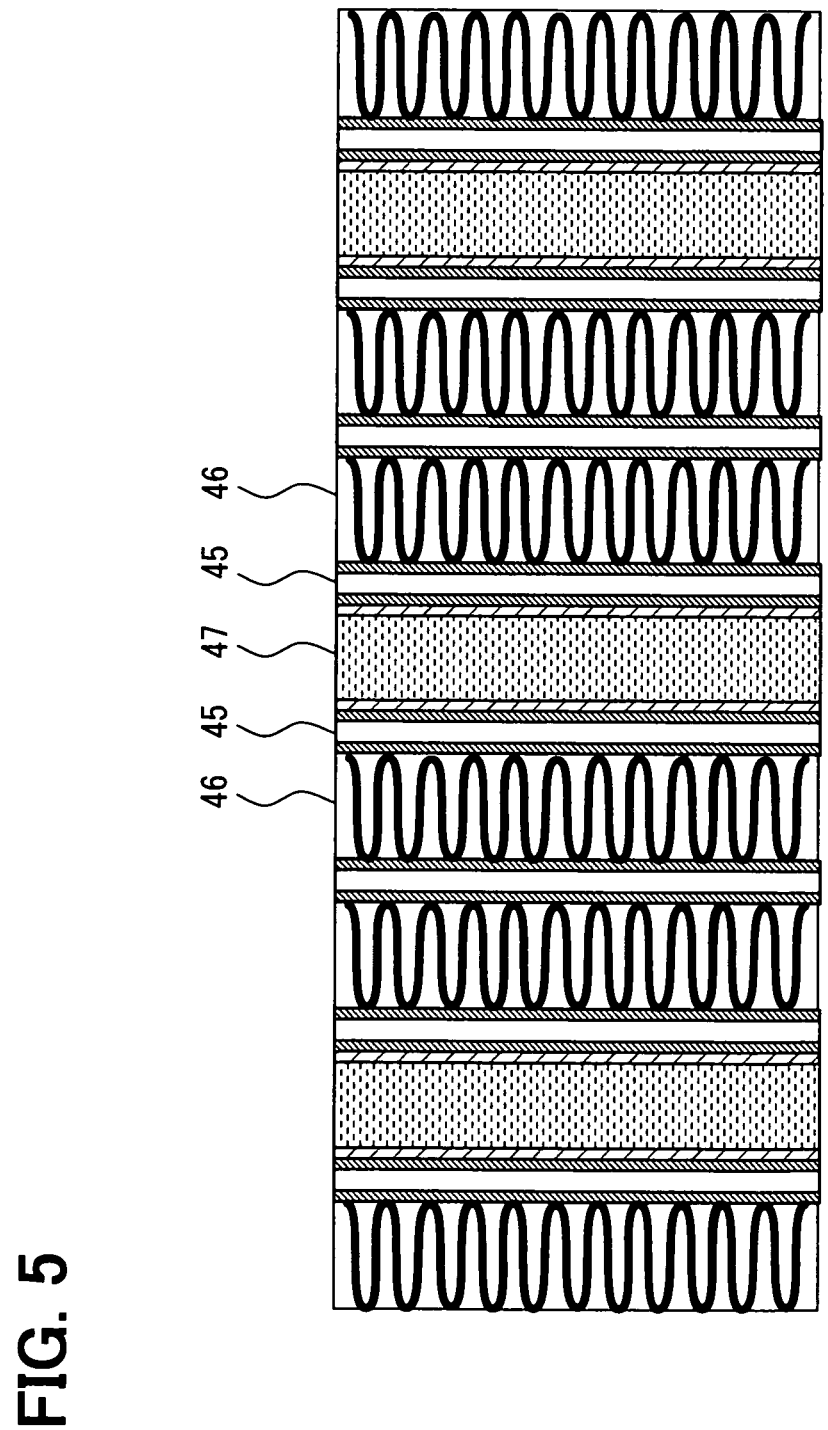
FIG. 5 is an enlarged partial view showing a longitudinal cross section taken along a line V-V of FIG. 3A.

FIG. 2 is a plan view showing the evaporator 40, which is a cool-storage type heat exchanger according to the first embodiment. FIG. 3A is a side view showing the heat exchanger of FIG. 2. FIG. 3B is a schematic perspective view of the heat exchanger showing refrigerant flow in the heat exchanger. FIG. 4 is an enlarged partial view showing a transverse cross section taken along a line IV-IV of FIG. 2. FIG. 5 is an enlarged partial view showing a longitudinal cross section taken along a line V-V of FIG. 3.

In FIGS. 2, 3A and 3B, the evaporator 40 has multiple refrigerant flow paths, which are formed by passage members made of metal, such as aluminum. The refrigerant flow paths are formed by pairs of header tanks 41, 42, 43 and 44 and multiple refrigerant tubes 45 connecting header tanks of each pair. The refrigerant flows are indicated by arrows in FIG. 3B.

In FIGS. 2, 3A and 3B, a first and a second header tanks 41 and 42 form a first pair of tanks, wherein each of the header tanks 41 and 42 is arranged at a predetermined distance and in parallel to each other. In the same manner, a third and a fourth header tanks 43 and 44 form a second pair of tanks, wherein each of the header tanks 43 and 44 is arranged at a predetermined distance and in parallel to each other. A plurality of refrigerant tubes 45 are arranged between the first and second header tanks 41 and 42 at equal distances. Each end of the refrigerant tubes 45 is communicated with insides of the header tanks 41 and 42. A first heat exchanger portion 48 is formed by the first and second header tanks 41 and 42 and the multiple refrigerant tubes 45 arranged therebetween.

In the same manner, a plurality of refrigerant tubes 45 are arranged between the third and fourth header tanks 43 and 44 at equal distances. Each end of the refrigerant tubes 45 is communicated with insides of the header tanks 43 and 44. A second heat exchanger portion 49 is formed by the third and fourth header tanks 43 and 44 and the multiple refrigerant tubes 45 arranged therebetween. As above, the heat exchanger 40 is composed of two-layered first and second heat exchanger portions 48 and 49. The second heat exchanger portion 49 is positioned at an upstream side of the air flow, and the first heat exchanger portion 48 is positioned at a downstream side thereof.

A joint, which is formed as an inlet port for the refrigerant, is provided at one end of the first header tank 41. The inside of the first header tank 41 is divided into two (first and second) header portions 41a and 41b by a partition (not shown), which is provided at a longitudinal intermediate portion of the first header tank 41. The multiple refrigerant tubes 45 are divided into two (first and second) tube groups 48A and 48B. The refrigerant flows into the first header portion 41a of the first header tank 41. Then, the refrigerant is distributed from the first header portion 41a to the multiple refrigerant tubes of the first tube group 48A. The refrigerant flows through, the refrigerant tubes 45 of the first tube group 48A and flows into the second header tank 42. The refrigerant is collected in the second header tank 42 and distributed to the multiple refrigerant tubes 45 of the second tube group 48B. The refrigerant flows through the multiple refrigerant tubes 45 of the second tube group 48B and flows into the second header portion 41b of the first header tank 41. As above, a U-shaped flow path for the refrigerant is formed in the first heat exchanger portion 48.

A joint, which is formed as an outlet port for the refrigerant, is provided at one end of the third header tank 43. The inside of the third header tank 43 is likewise divided into two (first and second) header portions 43a and 43b by another partition (not shown), which is provided at a longitudinal intermediate portion of the third header tank 43. The multiple refrigerant tubes 45 are also divided into two (first and second) tube groups 49A and 49B. The first header portion 43a of the third header tank 43 is provided adjacent to the second header portion 41b of the first header tank 41, so that the first header portion 43a of the third header tank 43 and the second header portion 41b of the first header tank 41 are communicated with each other, as indicated by a dotted line in FIG. 3B.

The refrigerant flows from the second header portion 41b of the first header tank 41 into the first header portion 43a of the third header tank 43. Then, the refrigerant is distributed from the first header portion 43a to the multiple refrigerant tubes of the first tube group 49A. The refrigerant flows through the refrigerant tubes 45 of the first tube group 49A and flows into the fourth header tank 44. The refrigerant is collected in the fourth header tank 44 and distributed to the multiple refrigerant tubes 45 of the second tube group 49B. The refrigerant flows through the multiple refrigerant tubes 45 of the second tube group 49B and flows into the second header portion 43b of the third header tank 43. As above, a U-shaped flow path for the refrigerant is also formed in the second heat exchanger portion 49. The refrigerant, which flows out through the outlet port from the second header portion 43b of the third header tank 43, flows toward the compressor 10.

In FIGS. 4 and 5, the refrigerant tube 45 is formed of a multi-passage pipe having multiple refrigerant flow passages. The refrigerant tube 45 is also referred to as a flat tube 45. The multi-passage pipe may be formed by an extrusion process. Multiple refrigerant flow passages extend in a longitudinal direction of the refrigerant tube 45 and opened at both ends of the refrigerant tube 45. A plurality of the refrigerant tubes 45 are arranged in a line, which extends in parallel to the longitudinal direction of the header tanks. The plurality of the refrigerant tubes 45 are arranged in the line so that each of main surfaces is opposed to each other. A plurality of accommodating spaces are formed between the neighboring refrigerant tubes 45. Multiple cooling-storage containers 47 are arranged in some of the accommodating spaces, while air passages (through which air passes and the air is cooled down via heat exchange with the refrigerant flowing through the refrigerant tubes) are formed in the remaining accommodating spaces, as explained below.

The evaporator 40 has multiple fins 46 arranged in the air passages for increasing contact area with the air to be supplied into the passenger room of the vehicle. The fin 46 is composed of a corrugate-type fin 46. Each of the fins 46 is arranged in the respective air passages formed between the neighboring refrigerant tubes 45. The fin 46 is thermally connected with the refrigerant tubes 45. The fin 46 is attached to the refrigerant tubes 45 by jointing material having a high heat transfer. The jointing material may be soldering material. The fin 46 is made of a thin metal plate formed into a wave shape, such as aluminum. A plurality of louvers are formed on the fin 46.

The evaporator 40 further has a plurality of cooling-storage containers 47, which is made of a metal, such as aluminum. The cooling-storage container 47 is formed as a multi-space flat tube, wherein multiple spaces longitudinally extending are formed. A longitudinal end of the cooling-storage container 47 is flattened out in its thickness direction, so that the end thereof is closed. Both longitudinal ends of the container 47 are so closed that cooling-storage material 50 is inserted and held therein in a sealing manner. Each of the cooling-storage containers 47 has a pair of main outside surfaces, each of which is in a surface-to-surface contact with the main surface of the refrigerant tubes 45.

The cooling-storage containers 47 are arranged in the accommodating spaces formed between the neighboring refrigerant tubes 45 and thermally connected to them. The cooling-storage containers 47 are attached to the refrigerant tubes 45 by jointing material having a high heat transfer. Soldering material or resin material, such as bonding material, may be used as the jointing material. The cooling-storage containers 47 are soldered to the refrigerant tubes 45. A large amount of soldering material is disposed between the cooling-storage containers 47 and the refrigerant tubes 45, so that they are connected with each other through a large surface area. The soldering material may be clad on either one side or both sides of the cooling-storage containers 47 and the refrigerant tubes 45. As a result, a high heat transfer may be realized between the cooling-storage containers 47 and the refrigerant tubes 45.

In FIGS. 4 and 5, a thickness "T" of the cooling-storage container 47 is substantially equal to that for the air passage (that is, the accommodating space). Therefore, the thickness "T" of the cooling-storage container 47 is also substantially equal to that for the fin 46. The cooling-storage containers 47 and the fins 46 can be exchanged with each other. Accordingly, it becomes more flexible to design a pattern for the multiple cooling-storage containers 47 and the multiple fins 46. The thickness "T" of the cooling-storage container 47 is larger than a thickness of the refrigerant tube 45. This kind of structure is advantageous for inserting a larger amount of the cooling-storage material 50. A length "L" of the cooling-storage container 47 is almost equal to that for the corrugated fin 46. Therefore, almost all of the accommodating space in the longitudinal direction between the neighboring refrigerant tubes 45 is occupied by the cooling-storage container 47. Any gap of the accommodating space in the longitudinal direction between the cooling-storage container 47 and the header tank 41, 42, 43 or 44 may be preferably occupied by a small piece of corrugated fins 46 or filling material, such as resin.

The cooling-storage container 47 has a pair of main wall portions 47a forming the main outside surfaces and multiple partitioning portions 47b extending from one wall portion 47a to the other wall portion 47a to connect both of the wall portions 47a with each other. Multiple small spaces for the cooling-storage material 50 are formed in the cooling-storage container 47, wherein the small spaces extend in the longitudinal direction of the cooling-storage container 47. The multiple small spaces are arranged in the cooling-storage container in a direction of the air flow passing through the evaporator 40. Each of the small spaces is communicated with each other at both longitudinal ends of the cooling-storage container 47. Each of the small spaces has a cross sectional area, which is substantially larger than that for the refrigerant flow passage of the refrigerant tube 45.

In FIG. 2, the multiple refrigerant tubes 45 are arranged at a constant distance. Multiple spaces (that is, the accommodating spaces) are respectively formed between the neighboring refrigerant tubes 45. The multiple fins 46 and the multiple cooling-storage containers 47 are respectively disposed in the multiple accommodating spaces in accordance with a predetermined ordinality. The accommodating spaces in which the fins 46 are disposed are the air passages. The remaining accommodating spaces are the spaces for the cooling-storage containers 47. The spaces between 10% and 50% of all accommodating spaces between the refrigerant tubes 45 are used as the spaces for the cooling-storage containers 47. The cooling-storage containers 47 are equally arranged over the evaporator 40. Each of the refrigerant tubes 45 disposed at both sides of the cooling-storage container 47 respectively defines the air passage together with each of the opposing refrigerant tubes 45, through which the air flows for carrying out heat exchange with the refrigerant flowing through the refrigerant tubes 45. In other words, two refrigerant tubes 45 are arranged between two fins 46, and one cooling-storage container 47 is arranged between the two refrigerant tubes 45.

One cooling-storage container 47 and two neighboring refrigerant tubes 45 form one cooling-storage unit. In the evaporator 40, multiple cooling-storage units having the same structure are arranged at equal intervals. Furthermore, the multiple cooling-storage units are equally arranged in a bilateral direction. In addition, the multiple cooling-storage units are symmetrically arranged.

A plurality of first cooling-storage units arranged in the first heat exchanger portion 48 and a plurality of second cooling-storage units arranged in the second heat exchanger portion 49 are arranged in a layered-manner and aligned with each other in the direction of the air flow. The cooling-storage containers 47 of the first cooling-storage units and the cooling-storage containers 47 of the second cooling-storage units are separated from each other, and spaces are provided between them as a heat insulating means.

A pattern of the refrigerant tubes 45, the fins 46 and the cooling-storage containers 47 will be explained hereinafter, when viewing the evaporator from its side-most end (for example, from a left-most end in FIG. 2). A side plate is arranged at the left-most end of the evaporator 40 as a reinforcing member. The fin 46 is arranged between the reinforcing member (the side plate) and the refrigerant tube 45, which is the first tube from the left-most end. The fins 46 are arranged at both sides of the first refrigerant tube 45. The cooling-storage container 47 is arranged between the second and third refrigerant tubes 45. The fin 46 is arranged between the third and fourth refrigerant tubes 45. The fin 46 is also arranged between the fourth and fifth refrigerant tubes 45. The cooling-storage container 47 is arranged between the fifth and sixth refrigerant tubes 45. The fin 46 is arranged between the sixth and seventh refrigerant tubes 45. The above pattern is repeated from the left-most end to the right-most end of the evaporator 40.

According to the structure of FIG. 2, the fins 46 are provided at both side ends of the evaporator 40. The cooling-storage containers 47 are not arranged at both side ends. Furthermore, the fins 46 are arranged at both sides of the left-most and right-most refrigerant tubes 45. The cooling-storage containers 47 are not arranged at both sides of the left-most and right-most refrigerant tubes 45. The cooling-storage containers 47 are only arranged between the predetermined neighboring refrigerant tubes 45. And the fins 46 are not arranged between such refrigerant tubes 45, between which the cooling-storage container 47 is arranged. The fins 46 are arranged at both sides of the cooling-storage unit, that is, the fins 46 are arranged at outer sides of the refrigerant tubes 45 positioned at both sides of the cooling-storage container 47. According to the above arrangement, the refrigerant tubes 45 and the fins 46 are symmetrically arranged with respect to the cooling-storage container 47. This symmetric arrangement for the cooling-storage containers 47, the refrigerant tubes 45 and the fins 46 is formed over the entire evaporator 40.

FIGS. 6 to 10 are graphs respectively showing relationships between an occupying ratio of the cooling-storage containers 47 and various characteristics of the evaporator 40. According to the structure of FIG. 2, the cooling-storage containers 47 occupies one-third of the total accommodating spaces between the refrigerant tubes, and the remaining two-third of the accommodating spaces between the refrigerant tubes is occupied by the fins 46 (that is, the air passages). Therefore, the occupying ratio of the cooling-storage container 47 is 33%. The occupying ratio is decided so as to perform a high cooling-energy radiating characteristic. The inventors of the present inventions studied the performance of the evaporator 40 with respect to the occupying ratio in various view points. According to the study of the inventors, a high performance of the evaporator can be achieved in the case the occupying ratio is set within a predetermined range.

Figure 6:
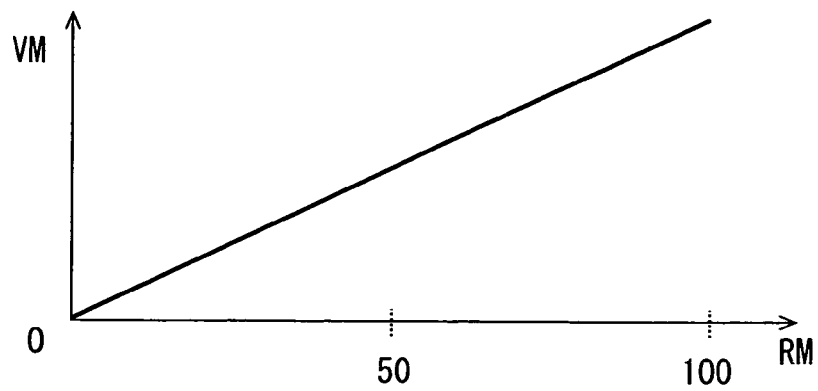
FIG. 6 is a graph showing a relationship between an occupying ratio RM and a capacity VM of a cooling-storage material.
Figure 7:
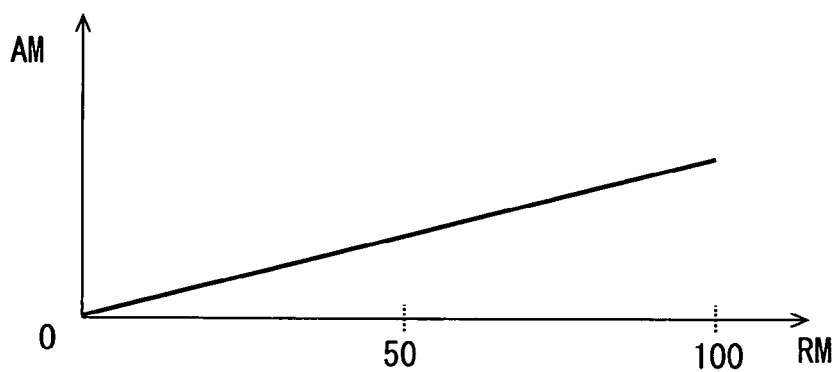
FIG. 7 is a graph showing a relationship between the occupying ratio RM and a heat transfer area AM of the cooling-storage material.
Figure 8:
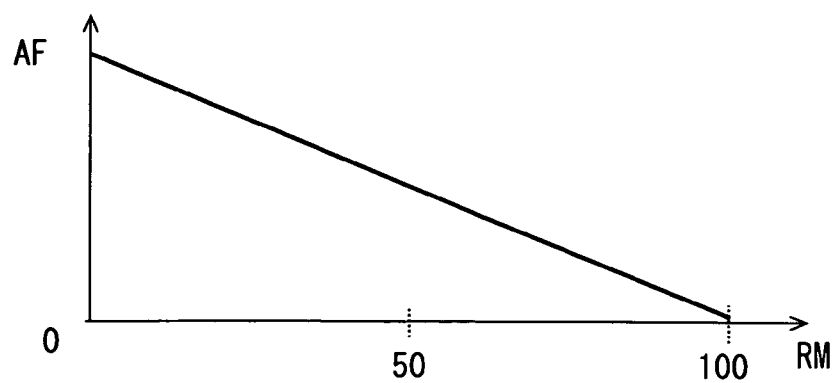
FIG. 8 is a graph showing a relationship between the occupying ratio RM and a fin area AF.

For example, as shown in FIG. 6, a capacity VM of the cooling-storage material 50 can be increased as the occupying ratio RM is made larger. As shown in FIG. 7, a heat transfer area AM of the cooling-storage material 50 can be increased, when the occupying ratio RM is made larger. Furthermore, as shown in FIG. 8, a fin area AF of the fin 46 is relatively decreased, as the occupying ratio RM is made larger.

Figure 9:
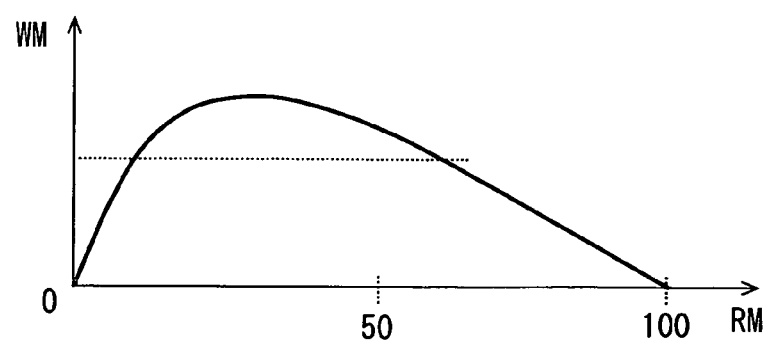
FIG. 9 is a graph showing a relationship between the occupying ratio RM and a cooling-energy radiating capability WM of the cooling-storage material.
Figure 10:
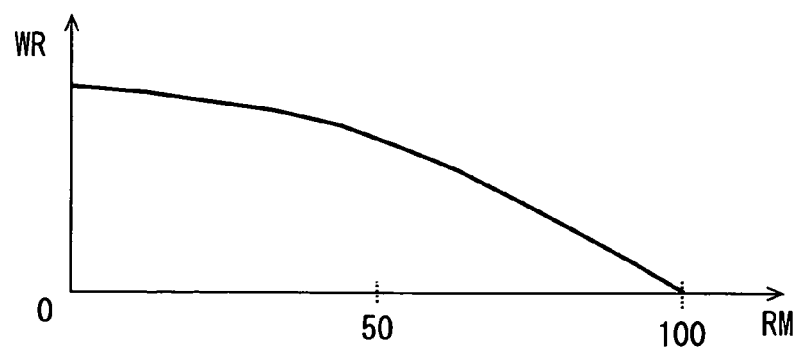
FIG. 10 is a graph showing a relationship between the occupying ratio RM and a cooling capability WR of refrigerant.

When considering the above characteristics, the cooling performance by the cooling-storage material 50, that is a cooling-energy radiating capability WM, draws a characteristic curve having a maximum value with respect to the occupying ratio RM. FIG. 9 is a graph showing a relationship between the occupying ratio RM and the cooling-energy radiating capability WM. As shown in FIG. 9, a high cooling-energy radiating capability WM can be achieved, when the occupying ratio RM is set at a value within a range, which is larger than 10% but less than 60%. The occupying ratio of around 30% is most preferable in order to obtain the highest cooling-energy radiating capability WM. As shown in FIG. 10, cooling capability WR of the refrigerant is decreased as the occupying ratio RM is increased. In view of the possible cooling capability WR required for the air conditioning apparatus, the higher the cooling capability WR is the better. From this view point, the occupying ratio RM may be preferable when it is less than 50%. According to the present embodiment, the occupying ratio is set at 33%, in view of a balance between the cooling-energy radiating capability WM by the cooling-storage material and the cooling capability WR of the refrigerant.

An operation of the present embodiment will be explained. When there is a command for an air conditioning operation, for example a command for a cooling operation, from a vehicle passenger, the compressor 10 is driven by the driving source 2. The compressor 10 draws the refrigerant from the evaporator 40, compresses the same and discharges the compressed refrigerant. The refrigerant discharged from the compressor 10 is radiated at the heat radiating device 20. The refrigerant from the heat radiating device 20 is depressurized by the depressurizing device 30 and supplied to the evaporator 40. The refrigerant is evaporated at the evaporator 40, to thereby cool down not only the cooling-storage container 47 but also the air passing through the evaporator 40 via the fins 46.

When the vehicle is temporarily stopped, the operation of the driving source 2 is also stopped in order to decrease consumption energy. Then, the operation of the compressor 10 is stopped. Thereafter, the refrigerant in the evaporator 40 gradually loses its cooling capability. During this process, the cooling-storage material 50 gradually radiates cooling-energy to thereby cool down the air. In this operation, the heat of the air is transmitted to the cooling-storage material 50 through the fins 46, the refrigerant tubes 45 and the cooling-storage containers 47. As a result, the air can be continuously cooled down by the cooling-storage material 50, even after the refrigerating cycle 1 is temporarily stopped. When the vehicle starts again with its movement, the driving source 2 drives again the compressor 10, so that the refrigerating cycle 1 cools down the cooling-storage material 50 and storing the cooling-energy.

According to the present embodiment, the refrigerant tubes 45 and the fins 46 (the air passages) are symmetrically arranged with respect to the cooling-storage container 47. Accordingly, the cooling-storage material 50 is effectively cooled down from the pair of wall portions 47a of the cooling-storage container 47. The cooling-storage container 47 stores the cooling-energy equally from both sides thereof. In addition, the cooling container 47 radiates the stored cooling-energy equally from both sides thereof.

The cooling-storage container 47 is not in a direct contact with the fins 46. The cooling-storage container 47 is thermally connected with the fins 46 at least via the refrigerant tubes 45. Accordingly, even in the case the air having a high temperature temporarily flows through the air passages, the excessive radiation of the cooling-energy from the cooling-storage material 50 can be prevented.

The occupying ratio of the cooling-storage container 47 with respect to the accommodating spaces of the evaporator 40 is ⅓. Therefore, while the cooling capability of the refrigerant is not largely damaged, the high cooling-energy radiating capability WM can be achieved by the cooling-storage material. The multiple partitioning walls 47b, which work as heat exchange portions, increase contact area between the cooling-storage container 47 and the cooling-storage material 50, so that effective heat exchange between the cooling-storage container 47 and the cooling-storage material 50 can be realized. The cooling-storage container 47 is connected to the refrigerant tubes 45 by the soldering material, to thereby achieve a high heat transfer and a high productivity.

According to the present embodiment, the evaporator 40 provides one heat exchanging area. The heat exchanging area is arranged in a single air-flow passage defined in an air conditioning duct (formed in an air conditioning case). The multiple cooling-storage containers 47 are arranged at the equal distances in the evaporator 40. As a result, the cooling-storage containers 47 are equally arranged in the evaporator 40. In particular, the multiple cooling-storage containers 47 are equally distributed in a bilateral direction, in which the multiple refrigerant tubes 45 are arranged in a line. The multiple cooling-storage containers 47 are symmetrically arranged with respect to a center liner of the evaporator 40 in the bilateral direction, in which the refrigerant tubes 45 are arranged in the line. According to such an arrangement of the cooling-storage containers 47, a temperature distribution in a right-left direction (the bilateral direction) in the air conditioning duct can be suppressed.

(Second Embodiment)

Figure 11:
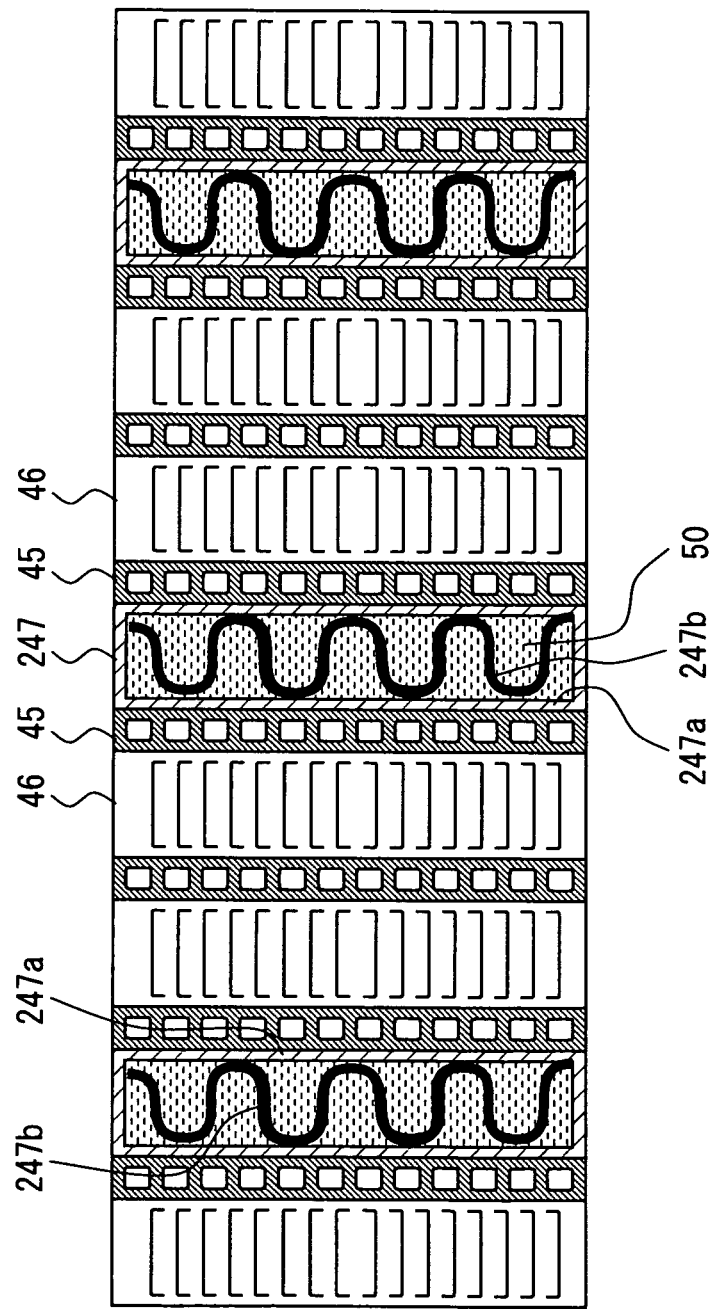
FIG. 11 is an enlarged partial view showing a transverse cross section of a heat exchanger according to a second embodiment of the present invention.
Figure 12:
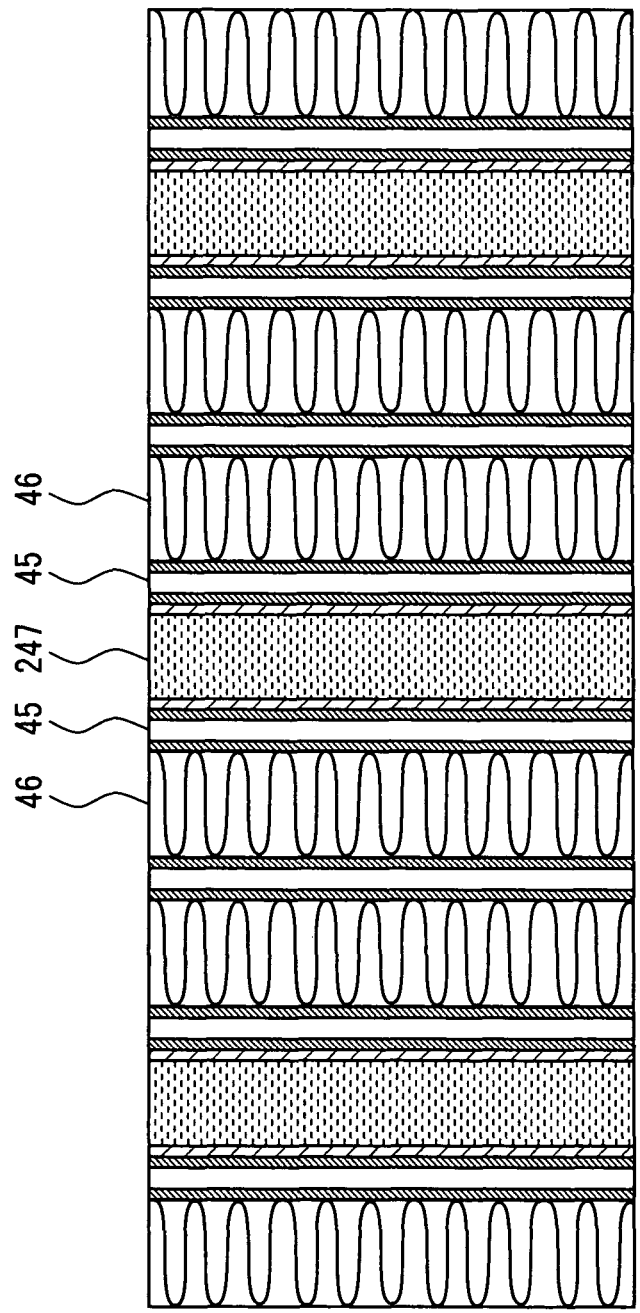
FIG. 12 is an enlarged partial view showing a longitudinal cross section of the heat exchanger according to the second embodiment of the present invention.

FIGS. 11 and 12 are enlarged partial views showing a heat exchanger (an evaporator) according to a second embodiment of the present invention, wherein FIG. 11 is a transverse sectional view and FIG. 12 is a longitudinal sectional view. FIG. 11 corresponds to a part of the cross sectional view taken along the line IV-IV of FIG. 2. FIG. 12 corresponds to a part of the cross sectional view taken along the line V-V of FIG. 3. The same reference numerals to the first embodiment are used for those portions in this embodiment, which are the same to the first embodiment.

A cooling-storage container 247 is formed as a flat tube having a rectangular cross-section. The cooling-storage container 247 has a pair of main wall portions 247a and a pair of side wall portions 247c. A corrugate type inner fin 247b forming a heat exchange portion is arranged inside of the cooling-storage container 247, wherein multiple top and bottom portions of the inner fin 247b are alternately arranged in the direction of the air flow. Each of the top and bottom portions of the inner fin 247.b extends in a longitudinal direction of the cooling-storage container 247 and those multiple top and bottom portions are soldered to the main wall portions 247a. According to such a structure, the contact area between the cooling-storage container 247 and the cooling-storage material 50 can be increased by means of the inner fin 247b.

(Third Embodiment)

Figure 13:
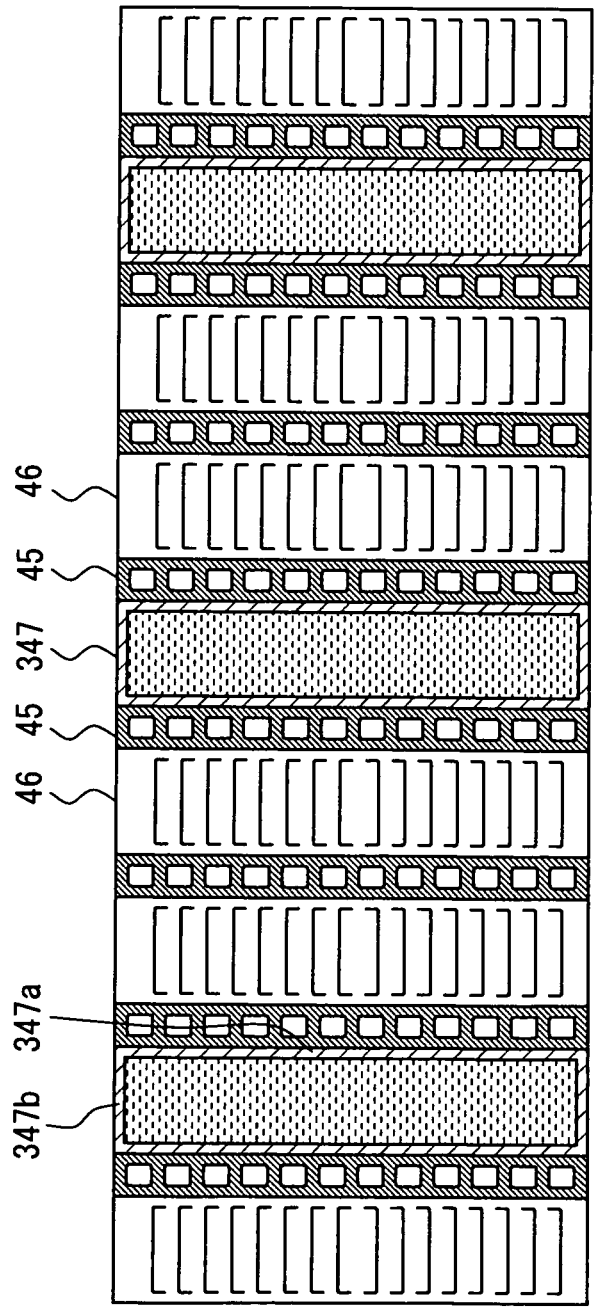
FIG. 13 is an enlarged partial view showing a transverse cross section of a heat exchanger according to a third embodiment of the present invention.
Figure 14:
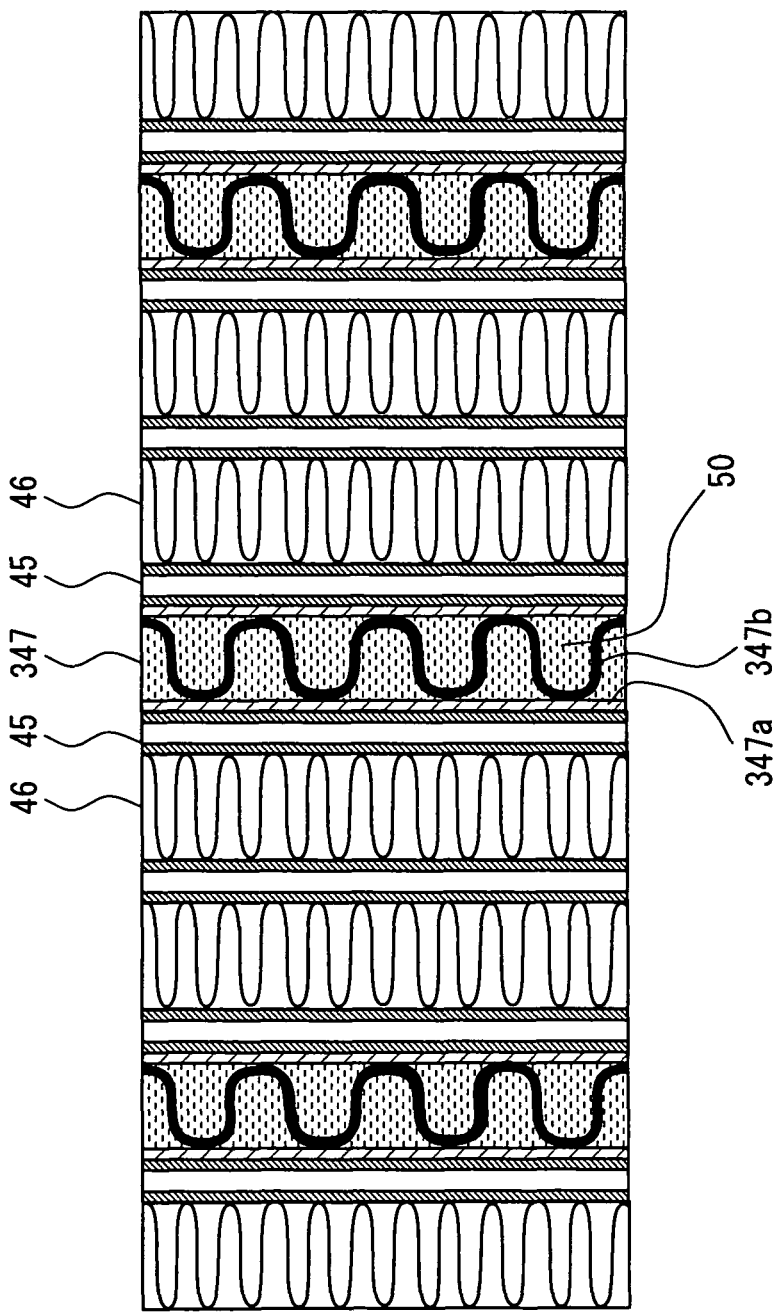
FIG. 14 is an enlarged partial view showing a longitudinal cross section of the heat exchanger according to the third embodiment of the present invention.

FIGS. 13 and 14 are enlarged partial views showing a heat exchanger (an evaporator) according to a third embodiment of the present invention, wherein FIG. 13 is a transverse sectional view and FIG. 14 is a longitudinal sectional view. FIG. 13 corresponds to a part of the cross sectional view taken along the line IV-IV of FIG. 2. FIG. 14 corresponds to a part of the cross sectional view taken along the line V-V of FIG. 3. The same reference numerals to the first embodiment are used for those portions in this embodiment, which are the same to the first embodiment.

A cooling-storage container 347 is formed as a flat tube having a rectangular cross-section, as in the same manner to the cooling-storage container 247 of the second embodiment (FIGS. 11 and 12). The cooling-storage container 347 has a pair of main wall portions 347a and a pair of side wall portions 347c. A corrugate type inner fin 347b forming a heat exchange portion is arranged inside of the cooling-storage container 347, wherein multiple top and bottom portions of the inner fin 347b are alternately arranged in the longitudinal direction of the cooling-storage container 347. Each of the top and bottom portions of the inner fin 347b extends in the direction of the air flow and those multiple top and bottom portions are soldered to the main wall portions 347a. According to such a structure, the contact area between the cooling-storage container 347 and the cooling-storage material 50 can be also increased by means of the inner fin 347b.

(Fourth Embodiment)

Figure 15:
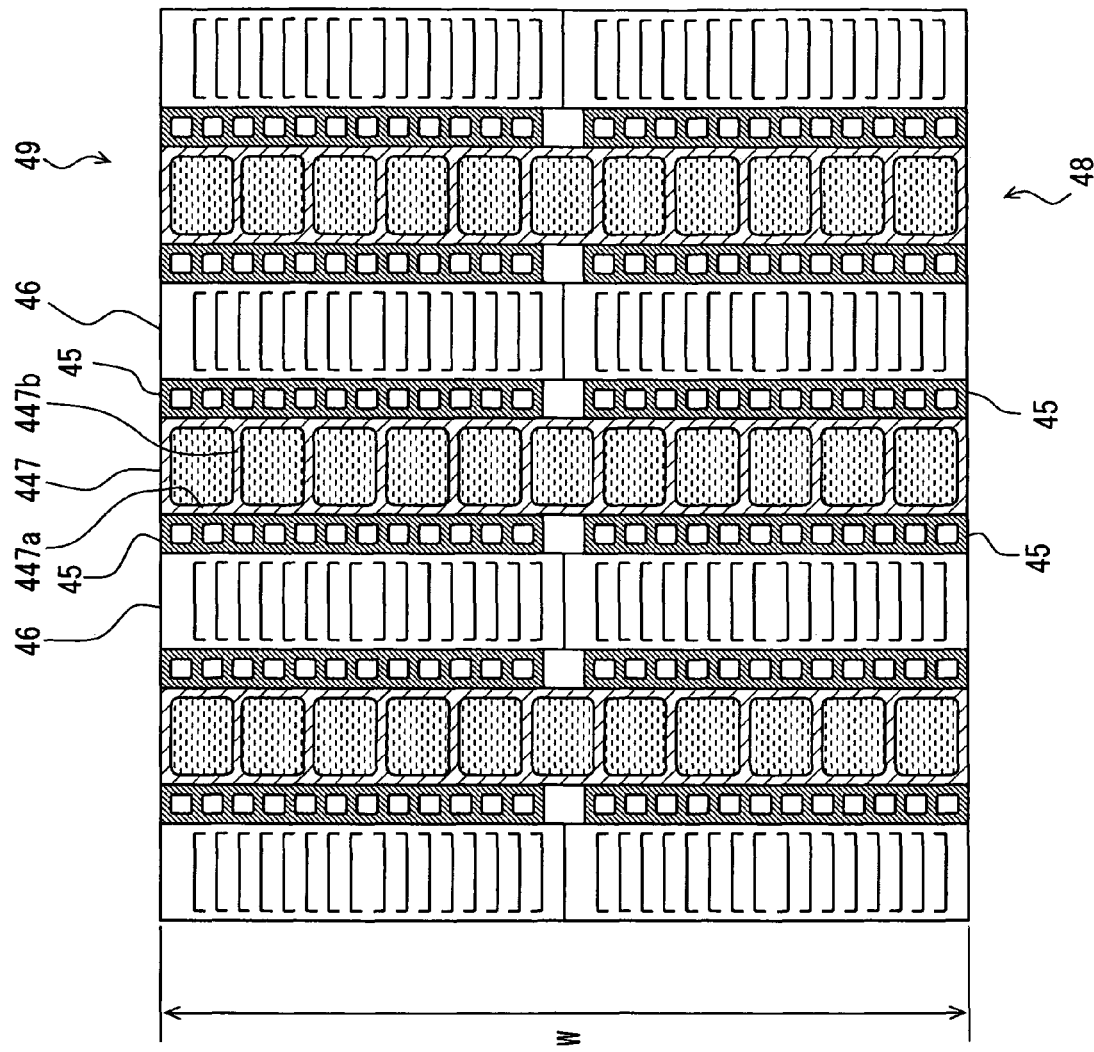
FIG. 15 is an enlarged partial view showing a transverse cross section of a heat exchanger according to a fourth embodiment of the present invention.

FIG. 15 is an enlarged partial view showing a heat exchanger (an evaporator) according to a fourth embodiment of the present invention, wherein FIG. 15 is a transverse sectional view corresponding to apart of the cross sectional view taken along the line IV-IV of FIG. 2. The same reference numerals to the first embodiment are used for those portions in this embodiment, which are the same to the first embodiment.

A cooling-storage container 447 has a width W in the direction of the air flow, wherein the width W is equal to an additional value of a width of the first heat exchanger portion 48 and a width of the second heat exchanger portion 49. Since the cooling-storage container 447 has the width W covering both of the widths for the two-layered heat exchanger portions 48 and 49 of the evaporator 40, it is possible to enlarge the capacity VM of the cooling-storage material 50.

The cooling-storage container 447 has a similar structure to that of the cooling-storage container 47 of the first embodiment (FIG. 4). The cooling-storage container 447 has a pair of main wall portions 447a forming the main outside surfaces and multiple partitioning portions 447b forming heat exchange portions, wherein each of the partitioning portions 447b extends from one wall portion 447a to the other wall portion 447a to define a plurality of small spaces, which are arranged in a layering direction of the two-layered heat exchanger portions 48 and 49 (that is, the direction of the air flow). Two refrigerant tubes 45 are arranged at one outside surface of the cooling-storage container 447. Other two refrigerant tubes 45 are likewise arranged at the other outside surface of the cooling-storage container 447. In other words, the cooling-storage container 447 has multiple refrigerant tubes 45 on each of the outside surfaces. As shown in FIG. 15, the cooling-storage container 447 has multiple small spaces (containing units) arranged in the direction of the width W. Each of the containing units has a length L equal to the length L shown in the first embodiment (FIG. 2). The cooling-storage container 447 having multiple containing units is arranged between the neighboring refrigerant tubes 45.

(Fifth Embodiment)

Figure 16:
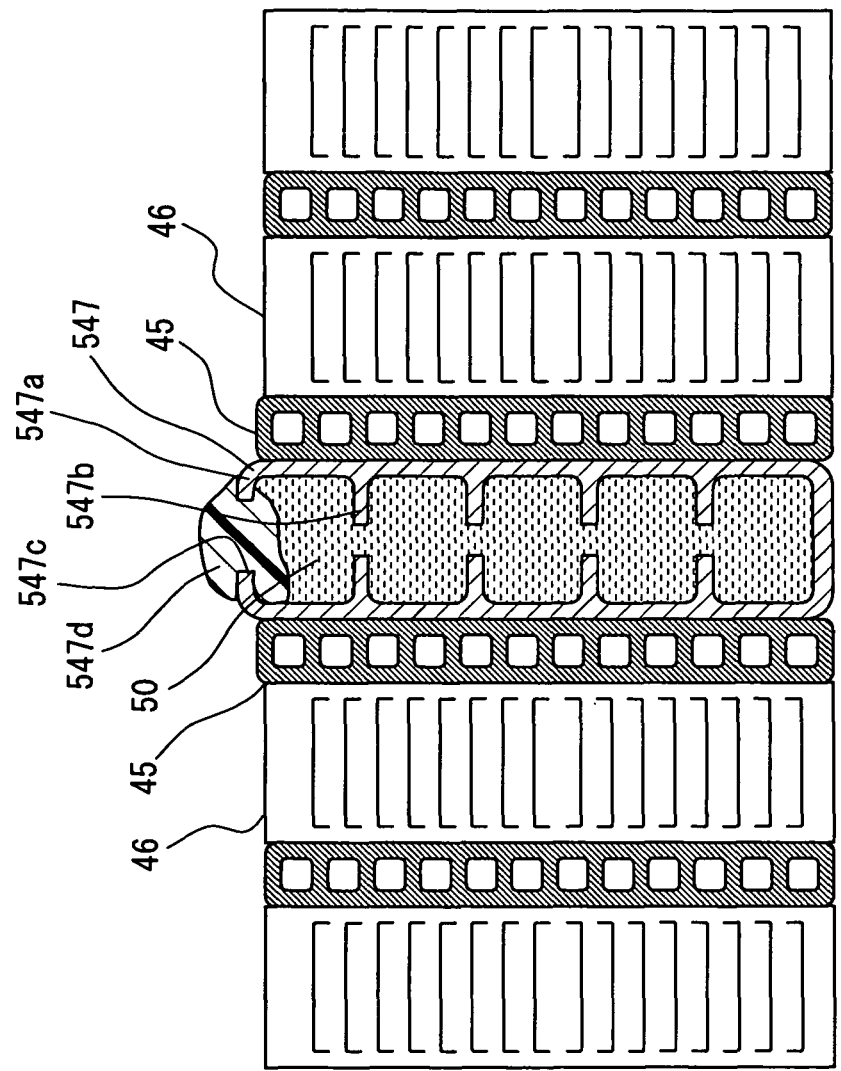
FIG. 16 is an enlarged partial view showing a transverse cross section of a heat exchanger according to a fifth embodiment of the present invention.

FIG. 16 is an enlarged partial view showing a heat exchanger (an evaporator) according to a fifth embodiment of the present invention, wherein FIG. 16 is a transverse sectional view corresponding to a part of the cross sectional view taken along the line IV-IV of FIG. 2. The same reference numerals to the first embodiment are used for those portions in this embodiment, which are the same to the first embodiment.

A cooling-storage container 547 has a pair of main wall portions 547a and a plurality of projections 547b, each of which projects from one of the wall portion 547a toward the other wall portion 547a, wherein the projections 547b form heat exchange portions. The cooling-storage container 547 has multiple small spaces, which are communicated with each other to form one continuous inside space. An opening 547c is formed at one of side wall portions, through which the cooling-storage material 50 is inserted into the inside space of the cooling-storage container 547. The opening 547c is formed at the side wall portion, which is placed either at the upstream or downstream side of the evaporator 40 in the air flow. A sealing member 547d of heat-hardening resin, such as epoxy resin, is plugged into the opening 547c.

When the evaporator 40 is manufactured, at first, parts for the cooling-storage containers 547, the refrigerant tubes 45, the fins 46 and other parts are prepared. Then, those parts are temporarily assembled. The temporarily assembled evaporator (semi-manufactured evaporator) is brought in a soldering oven to carry out a soldering process. The cooling-storage containers 547, the refrigerant tubes 45 and the fins 46 are firmly soldered to each other.

The cooling-storage material 50 is then inserted into the cooling-storage containers 547 through the openings 547c. And the sealing members 547d are plugged into the openings 547c. According to the present embodiment, the cooling-storage containers 547 can be easily assembled to the evaporator 40 during the manufacturing process. The manufacturing process may be applied to the other embodiments of the present invention.

(Sixth Embodiment)

Figure 17:
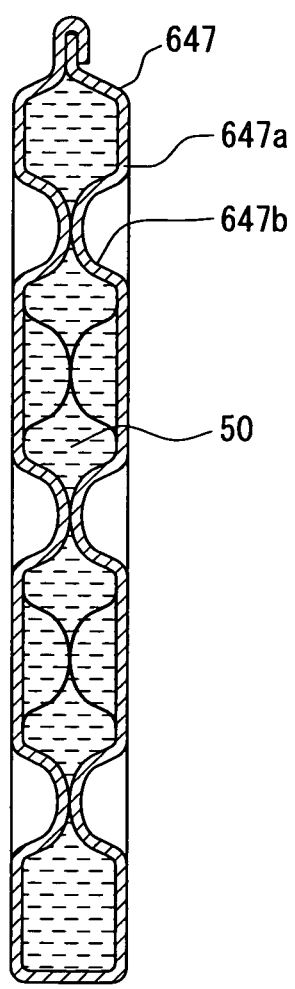
FIG. 17 is an enlarged partial view showing a transverse cross section of a cooling-storage container for a heat exchanger according to a sixth embodiment of the present invention.

FIG. 17 is an enlarged partial view showing a cooling-storage container for a heat exchanger (an evaporator) according to a sixth embodiment of the present invention, wherein FIG. 17 is a transverse sectional view. A cooling-storage container 647 is formed of a thin metal plate, which is bent into a flat tube shape. One end of the metal plate is wrapped by the other end. The cooling-storage container 647 has a pair of main wall portions 647a extending in a longitudinal direction (a direction perpendicular to a sheet of FIG. 17). Each of longitudinal ends of the cooling-storage container 647 is flattened out in its thickness direction (right-left direction in FIG. 17), so that the end thereof is closed.

A plurality of dimples 647b are formed at the wall portions 647a. The dimple 647b is formed by a convex portion projecting from one wall portion toward the other wall portion. The dimples form heat exchange portions. Each of the dimples 647b formed at one wall portion 647a is opposing to respective dimples 647b formed at the other wall portion 647a and respective opposing top portions of the dimples are connected to each other. The plurality of the dimples increase the contacting area between the cooling-storage material 50 and the cooling-storage container 647. The cooling-storage container 647 of the present embodiment may be used as cooling-storage container for the other embodiments of the present invention.

(Seventh Embodiment)

Figure 18:
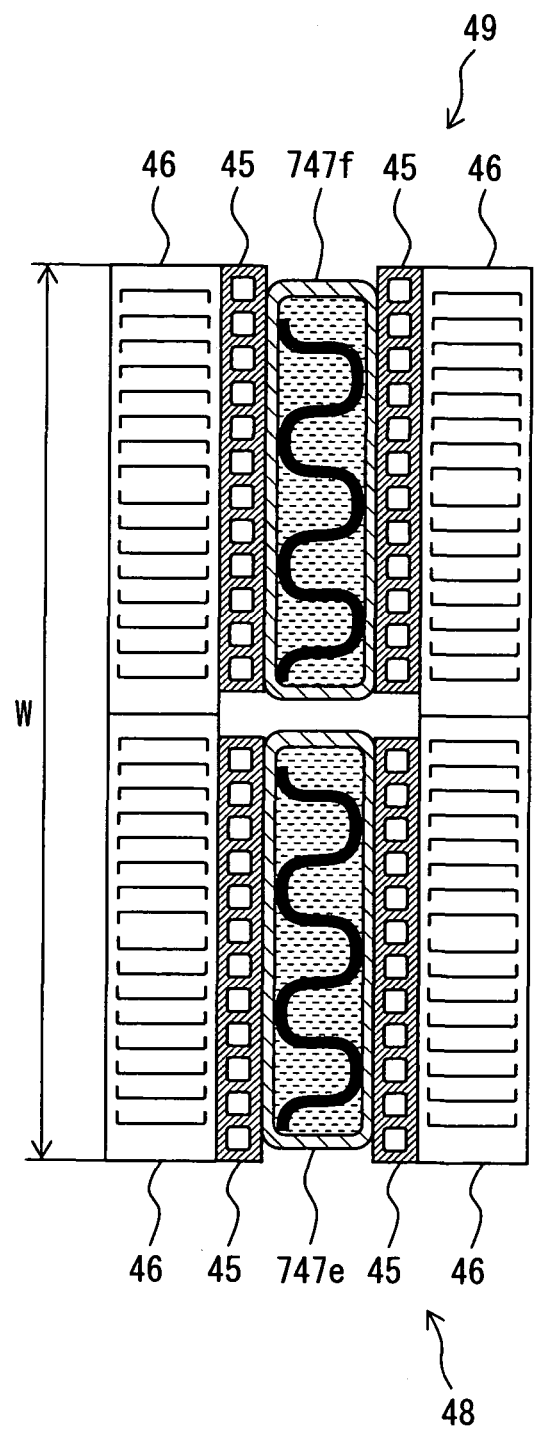
FIG. 18 is an enlarged partial view showing a transverse cross section of a heat exchanger according to a seventh embodiment of the present invention.

FIG. 18 is an enlarged partial view showing a heat exchanger (a part of an evaporator) according to a seventh embodiment of the present invention, wherein FIG. 18 is a transverse sectional view corresponding to a part of the cross sectional view taken along the line IV-IV of FIG. 2. The same reference numerals to the first embodiment are used for those portions in this embodiment, which are the same to the first embodiment.

A first cooling-storage unit (having one cooling-storage container 747e and two refrigerant tubes 45 at both sides of the cooling-storage container 747e) is provided in the first heat exchanger portion 48. A second cooling-storage unit (having one cooling-storage container 747f and two refrigerant tubes 45 at both sides of the cooling-storage container 747f) is likewise provided in the second heat exchanger portion 49. The first and second cooling-storage units are separated from each other, so that a space (which works as a heat insulating means) is formed between the first and second cooling-storage units.

According to the above structure, the first and second cooling-storage units are thermally separated from each other, so that heat transfer between the cooling-storage containers 747e and 747f is suppressed. As a result, temperature of the cooling-storage container 747e can be controlled at a different value from that of the cooling-storage container 747f. In addition, heat transfer between the cooling-storage material 50 in the cooling-storage container 747e and the cooling-storage material 50 in the cooling-storage container 747f can be suppressed. Movement of the cooling-storage material 50 in the container 747e or 747f can be also suppressed. A heat insulating member may be arranged between the cooling-storage containers 747e and 747f. In the embodiment shown in FIG. 18, inner fins are arranged in the respective cooling-storage containers 747e and 747f. The cooling-storage containers shown in the above first to sixth embodiments may be applied to the present seventh embodiment.

The refrigerant tubes 45 of the first heat exchanger portion 48 are arranged at an upstream side with respect to the refrigerant flow. The refrigerant tubes 45 of the second heat exchanger portion 49 are arranged, therefore, at a downstream side with respect to the refrigerant flow. The refrigerant in the refrigerant tubes 45 of the second heat exchanger portion 49 may become a super-heating gas condition, even when the refrigerant in the refrigerant tubes 45 of the first heat exchanger portion 48 is in a gas-liquid two phase condition. As a result, temperature of the cooling-storage material 50 of the second heat exchanger portion 49 may become higher than a melting point, even when temperature of the cooling-storage material 50 of the first heat exchanger portion 48 is lower than the melting point. As above, there may be a case in which temperature difference appears between the first and second heat exchanger portions 48 and 49, which results from the refrigerant flow.

The first heat exchanger portion 48 is arranged at the downstream side with respect to the air flow. The second heat exchanger portion 49 is, therefore, arranged at the upstream side with respect to the air flow. As a result, the temperature difference between the first and second heat exchanger portions 48 and 49 may also occur depending on the air flow. In such a case, in which the temperature difference occurs in a single cooling-storage container, there is concern that cooling-energy storing efficiency as well as cooling-energy radiating efficiency may be decreased.

According to the present embodiment, however, the heat insulating portion is provided between the cooling-storage containers 747e and 747f. Therefore, even when the temperature difference would occur between the first and second heat exchanger portions 48 and 49, it is possible to suppress the decrease of the cooling-energy storing efficiency as well as cooling-energy radiating efficiency. For example, the temperature of only one of the cooling-storage containers (e.g. the cooling-storage container 747e) is maintained below the melting point, and cooling-energy may be stored only in such cooling-storage container 747e.

(Eighth Embodiment)

Figure 19:
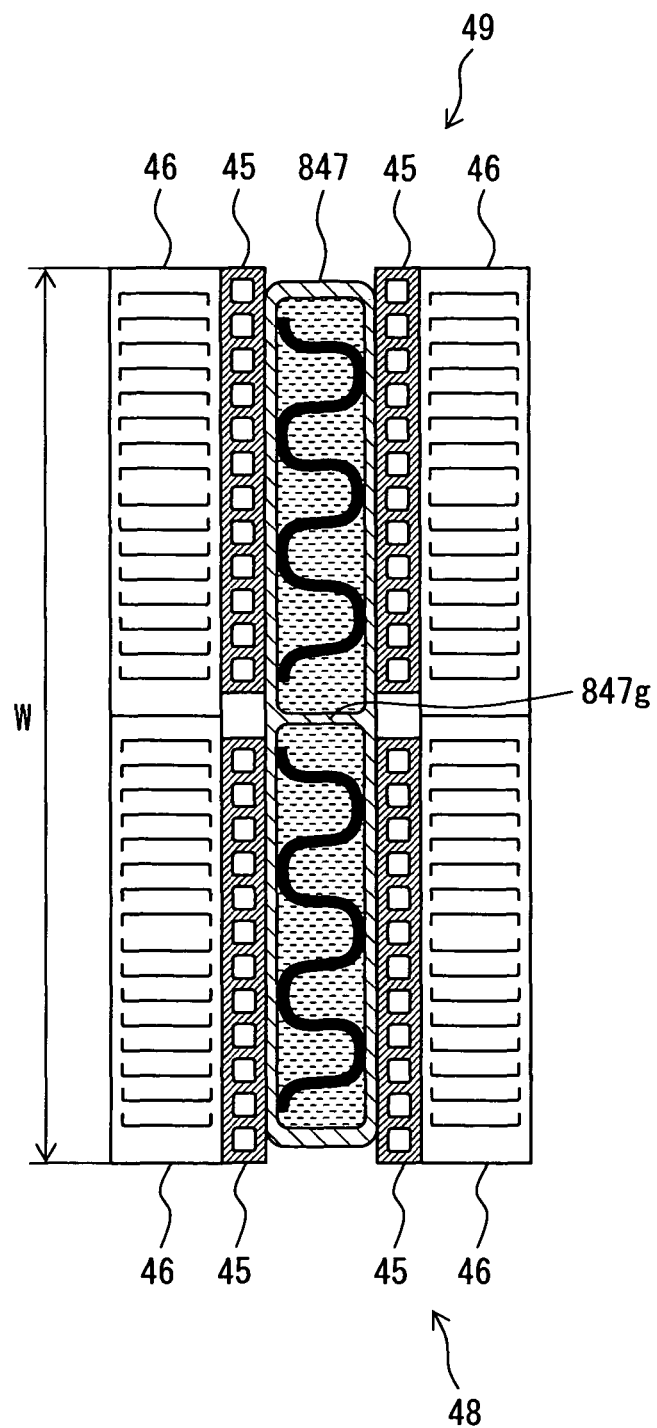
FIG. 19 is an enlarged partial view showing a transverse cross section of a heat exchanger according to an eighth embodiment of the present invention.

FIG. 19 is an enlarged partial view showing a heat exchanger (a part of an evaporator) according to an eighth embodiment of the present invention, wherein FIG. 19 is a transverse sectional view corresponding to apart of the cross sectional view taken along the line IV-IV of FIG. 2. The same reference numerals to the first embodiment are used for those portions in this embodiment, which are the same to the first embodiment.

A cooling-storage container 847 has a similar structure to the above explained seventh embodiment (FIG. 18). The cooling-storage container 847 is composed of a single container, wherein a partitioning wall 847g is provided in order to divide an inside space into two spaces for the first and second heat exchanger portions 48 and 49. The partitioning wall 847g is operated as the heat insulating portion between the cooling-storage materials 50 in the respective inside spaces of the cooling-storage container 847.

A first cooling-storage unit (comprising a portion of the cooling-storage container 847 for the first heat exchanger portion 48 and the refrigerant tubes 45) and a second cooling-storage unit (comprising a portion of the cooling-storage container 847 for the second heat exchanger portion 49 and the refrigerant tubes 45) are connected with each other by means of the partitioning wall 847g working as the heat insulating means.

According to the above structure, heat transfer between the cooling-storage materials 50 in the respective inside spaces of the cooling-storage container 847 can be suppressed. Movement of the cooling-storage material 50 in the cooling-storage container 847 can be also suppressed. The cooling-storage containers of the first to sixth embodiments may be also applied to the present embodiment in place of the cooling-storage container 847. Even when the temperature difference would occur between the first and second heat exchanger portions 48 and 49, it is possible to suppress the decrease of the cooling-energy storing efficiency as well as cooling-energy radiating efficiency, because the heat insulating portion (the partitioning wall 847g) is provided inside the cooling-storage container 847.

(Ninth Embodiment)

Figure 20:
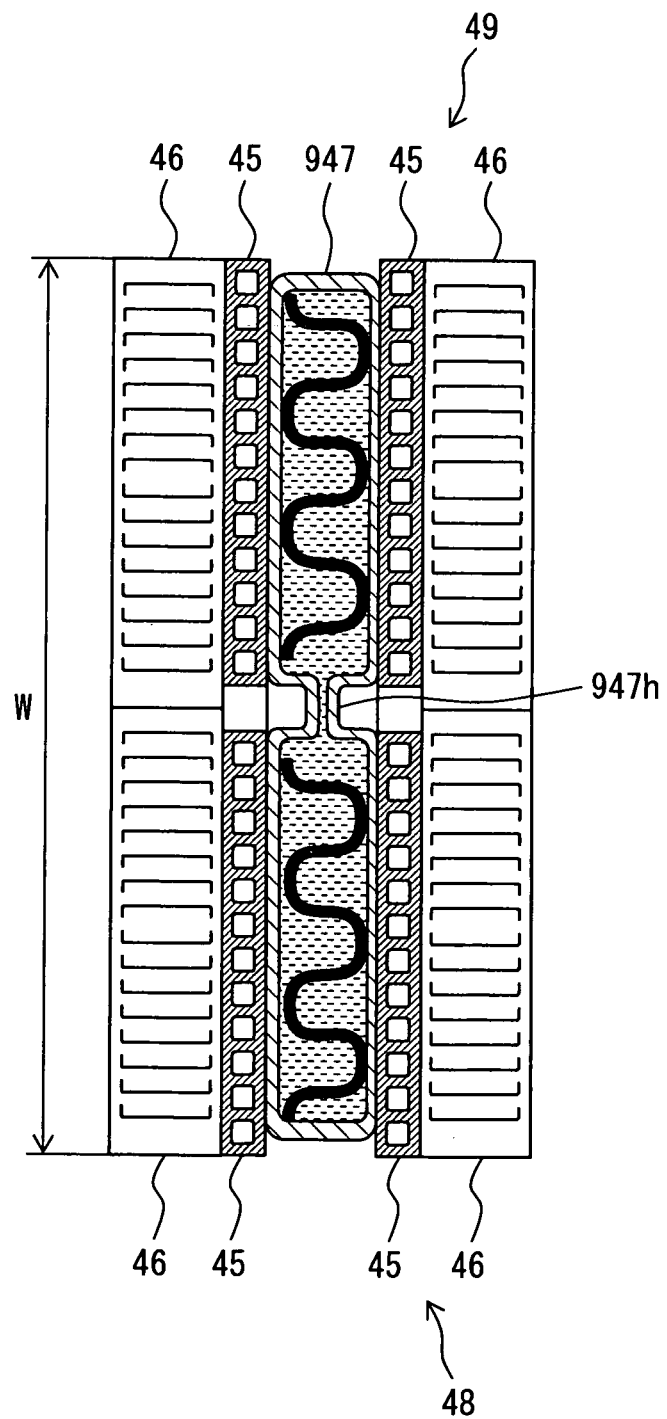
FIG. 20 is an enlarged partial view showing a transverse cross section of a heat exchanger according to a ninth embodiment of the present invention.

FIG. 20 is an enlarged partial view showing a heat exchanger (a part of an evaporator) according to a ninth embodiment of the present invention, wherein FIG. 20 is a transverse sectional view corresponding to a part of the cross sectional view taken along the line IV-IV of FIG. 2. The same reference numerals to the first embodiment are used for those portions in this embodiment, which are the same to the first embodiment.

A cooling-storage container 947 has a similar structure to the above explained eighth embodiment (FIG. 19). The cooling-storage container 947 is composed of a single container, wherein a restricted portion 947h is provided to define two inside spaces for the cooling-storage material 50 for the first and second heat exchanger portions 48 and 49. The restricted portion 947h is operated as the heat insulating portion between the cooling-storage materials 50 in the respective inside spaces of the cooling-storage container 947.

A first cooling-storage unit (comprising a portion of the cooling-storage container 947 for the first heat exchanger portion 48 and the refrigerant tubes 45) and a second cooling-storage unit (comprising a portion of the cooling-storage container 947 for the second heat exchanger portion 49 and the refrigerant tubes 45) are connected with each other by means of the restricted portion 947h working as the heat insulating means.

According to the above structure, heat transfer between the cooling-storage materials 50 in the respective inside spaces of the cooling-storage container 947 can be suppressed. Movement of the cooling-storage material 50 in the container 947 can be also suppressed. The cooling-storage containers of the first to sixth embodiments may be also applied to the present embodiment in place of the cooling-storage container 947. Even when the temperature difference would occur between the first and second heat exchanger portions 48 and 49, it is possible to suppress the decrease of the cooling-energy storing efficiency as well as cooling-energy radiating efficiency, because the heat insulating portion (the restricted portion 947h) is provided inside the cooling-storage container 947.

The restricted portion 947h may be formed by a press work by forming groove-like recessed portions opposing to each other at an intermediate portion of the cooling-storage container 947. The movement of the cooling-storage material 50 between two inside spaces may be completely prevented by the restricted portion 947h. The restricted portion 947h may be alternatively so formed that a small amount of the cooling-storage material 50 may move through the restricted portion 947h in order to improve workability when inserting the cooling-storage material 50 into the inside spaces.

(Tenth Embodiment)

Figure 21A:
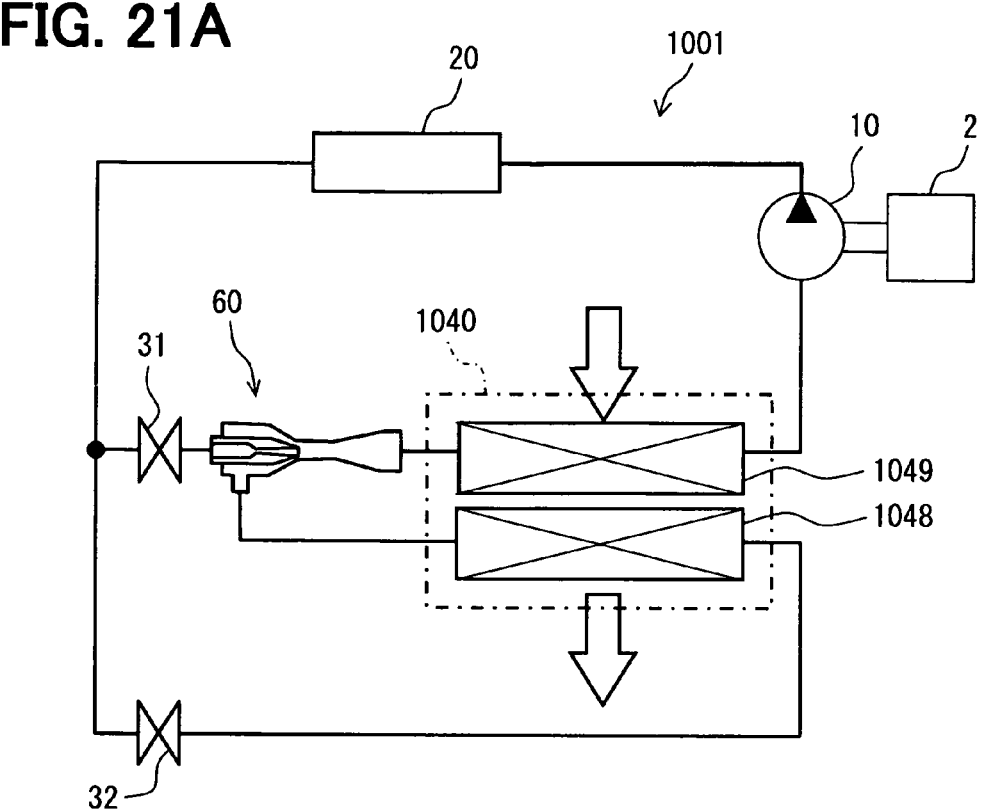
FIG. 21A is a schematic block diagram showing an ejector type refrigerating cycle according to a tenth embodiment of the present invention.
Figure 21B:
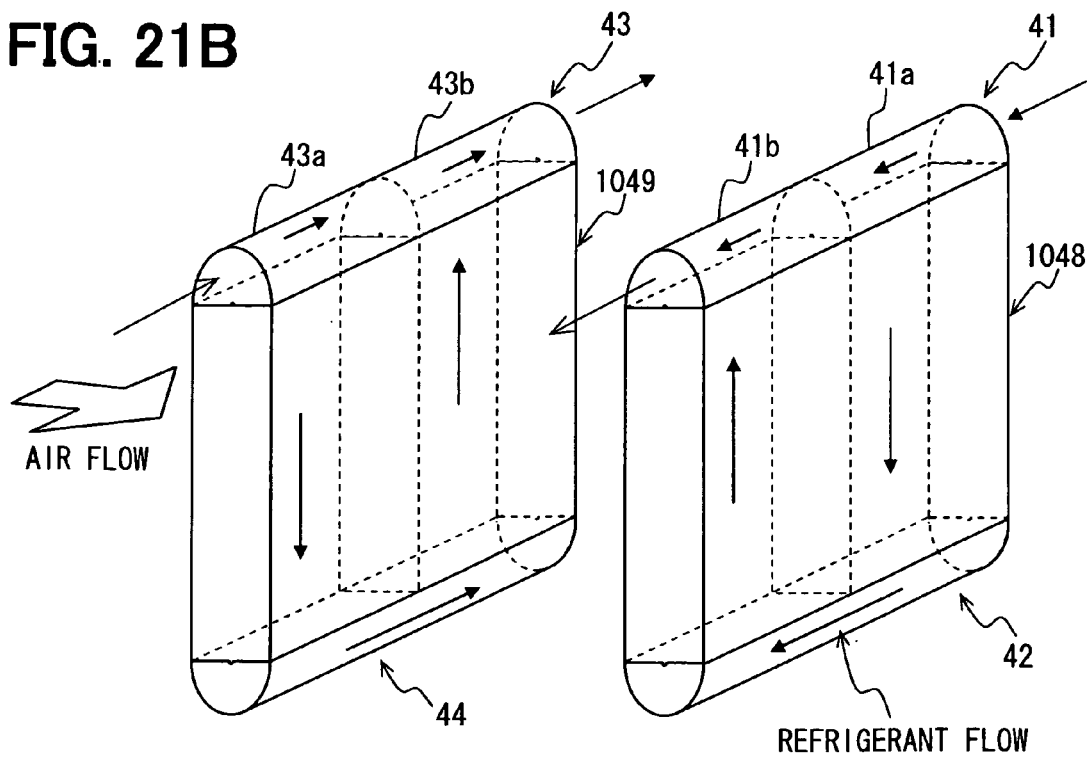
FIG. 21B is a schematic perspective view of the heat exchanger showing refrigerant flow in the heat exchanger.

FIG. 21A is a schematic block diagram showing an ejector type refrigerating cycle 1001 according to a tenth embodiment of the present invention. FIG. 21B is a schematic perspective view of a heat exchanger 1040 which is applied to the tenth embodiment, in which refrigerant flow in the heat exchanger is indicated by arrows. The same reference numerals to the above embodiments are used for those portions in this embodiment, which are the same to the above embodiments.

The refrigerating cycle 1001 has an ejector 60 having a high pressure inlet port, a low pressure inlet port and a mixed refrigerant outlet port. The high pressure refrigerant is supplied to the ejector 60 through the high pressure inlet port, so that the ejector 60 ejects the high pressure refrigerant from a nozzle. The refrigerant is sucked into the ejector through the low pressure inlet port when the high pressure refrigerant is ejected from the nozzle. The refrigerant ejected from the nozzle and the refrigerant sucked though the low pressure inlet port are mixed with each other in the ejector 60. Thus mixed refrigerant is slowed down and pressurized. The mixed refrigerant is discharged from the mixed refrigerant outlet port of the ejector 60.

An evaporator 1040 has a similar structure to the evaporator 40 of the first embodiment, as shown in FIG. 21B. In the first embodiment, the evaporator 40 has the communicating portion for communicating the second header portion 41b of the first header tank 41 with the first header portion 43a of the third header tank 43, so that the refrigerant flows from the first header tank 41 to the third header tank 43. However, the evaporator 1040 of the present embodiment does not have such a communicating portion. Instead, a refrigerant outlet port is formed at the second header portion 41b of the first header tank 41 and a refrigerant inlet port is formed at the first header portion 43a of the third header tank 43, so that each of first and second heat exchanger portions 1048 and 1049 operates as an independent evaporator. The first heat exchanger portion 1048 is arranged at a downstream side with respect to the air flow passing through the evaporator 1040. The second heat exchanger portion 1049 is arranged at an upstream side with respect to the air flow.

The refrigerating cycle 1001 has a bifurcated refrigerant path at a downstream side of the heat radiating device 20. A first depressurizing device 31 is provided in one refrigerant path, which is connected to the high pressure inlet port of the ejector 60. A second depressurizing device 32 is provided in another refrigerant path (bifurcated path), which is connected to an inlet port of the first heat exchanger portion 1048. An outlet port of the first heat exchanger portion 1048 is connected to the low pressure inlet port of the ejector 60. The mixed refrigerant outlet port of the ejector 60 is connected to an inlet port of the second heat exchanger portion 1049. An outlet port of the second heat exchanger portion 1049 is connected to the compressor 10. According to the above structure, the first heat exchanger portion 1048 is connected to a suction side of the ejector 60, while the second heat exchanger portion 1049 is connected to a discharge side of the ejector 60. As a result, temperature of the first heat exchanger portion 1048 becomes lower than that of the second heat exchanger portion 1049. As above, temperature difference occurs between the first and second heat exchanger portions 1048 and 1049.

The cooling-storage containers of the above explained embodiments may be applied to the evaporator 1040. The cooling-storage containers of the seventh to ninth embodiments may be preferably applied to the evaporator 1040. With such an arrangement (the evaporator 1040 with the cooling-storage containers of the seventh to ninth embodiments), it is possible to keep the temperature difference between the first and second heat exchanger portions 1048 and 1049.

(Eleventh Embodiment)

Figure 22:
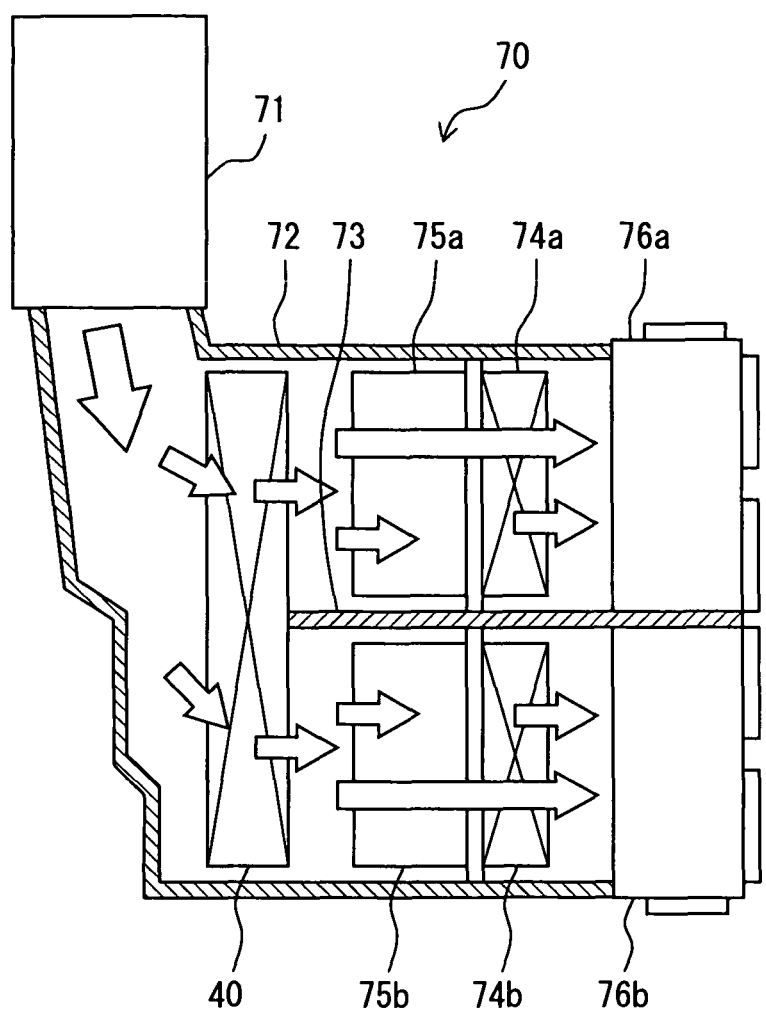
FIG. 22 is a schematic cross sectional view showing an air conditioning apparatus according to an eleventh embodiment of the present invention.

FIG. 22 is a schematic cross sectional view showing an air conditioning apparatus 70 according to an eleventh embodiment of the present invention. The same reference numerals to the above embodiments are used for those portions in this embodiment, which are the same to the above embodiments.

The air conditioning apparatus 70 is an air conditioning apparatus applied to a vehicle for respectively supplying air-conditioned air of different temperatures into two rooms, one for a driver and the other for a passenger. The air conditioning apparatus 70 has a blower unit 71, a temperature adjusting unit 72 (that is, an air conditioning case) and air duct units 76a and 76b. The evaporator 40 is provided inside of the temperature adjusting unit 72 covering an entire air-flow passage thereof. A center plate 73 is provided in the temperature adjusting unit 72 to define two air-flow passages. The center plate 73 extends from a downstream side of the evaporator 40 towards the air duct units 76a and 76b. In each of the air-flow passages divided by the center plate 73, an air-mixing door 75a (75b) and a heater core 74a (74b) are provided.

A flow amount of hot air passing through the heater core 74a (74b) and a flow amount of cold air bypassing over the heater core 74a (74b) are adjusted by the air-mixing door 75a (75b), so that temperature of mixed air flowing into the air duct units 76a (76b) is controlled at a desired temperature. The air-mixing doors 75a and 75b are independently controlled from each other. At the downstream sides of the respective air-flow passages, there are provided with the air duct unit 76a for the driver and the air duct unit 76b for the passenger. Each of the air duct units 76a and 76b has multiple openings, which are respectively connected to a defroster duct, a face duct, a foot duct and so on. Each of the air duct units 76a and 76b allows the air-conditioned air to flow into one of the ducts or into selected plural ducts.

Figure 23:
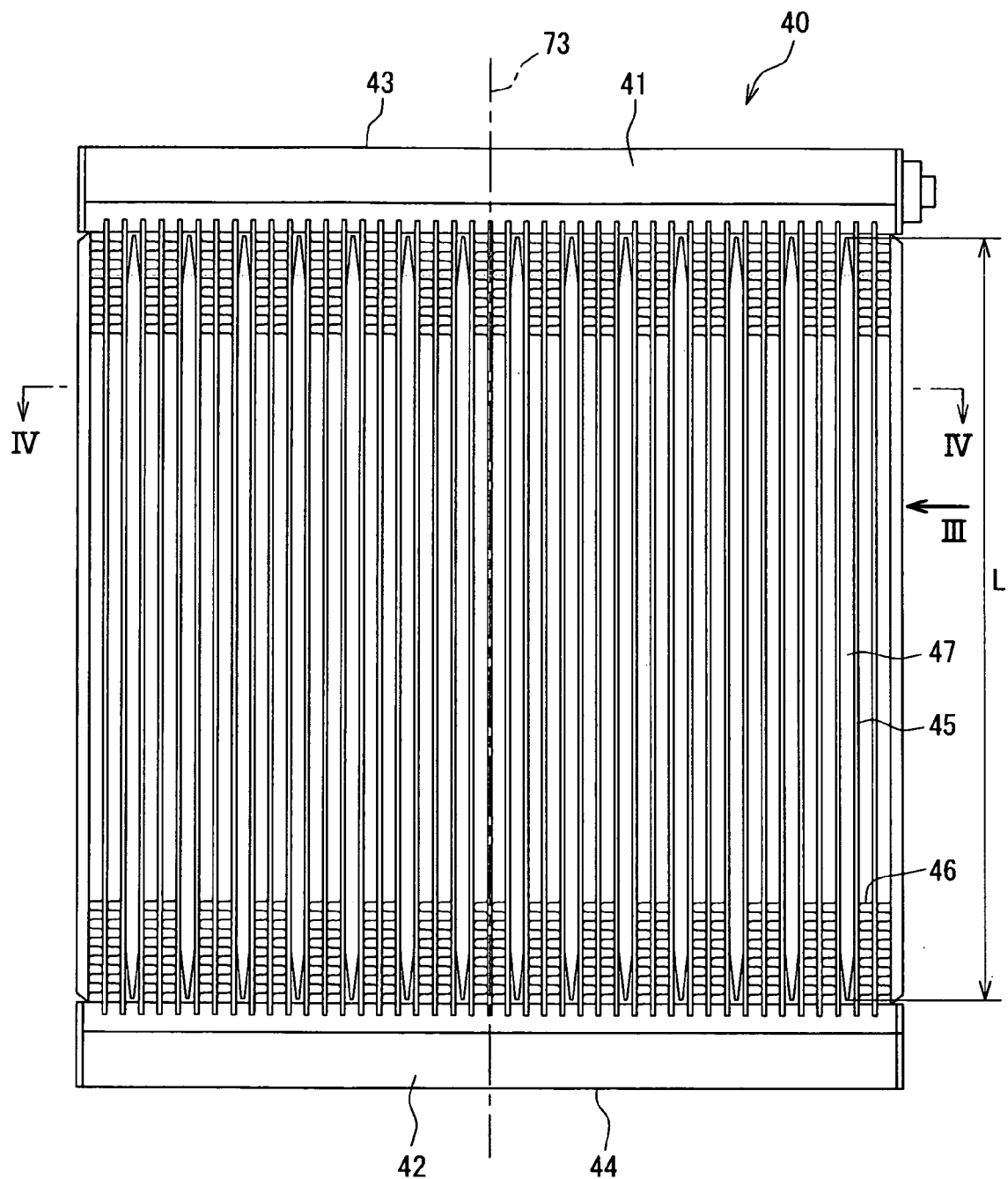
FIG. 23 is a plan view of a heat exchanger according to the eleventh embodiment.

FIG. 23 shows a plan view of the evaporator 40, which corresponds to the plan view of FIG. 2, wherein a position of the center plate 73 is indicated by a one-dot-chain line. The center plate 73 is positioned at a center of the evaporator 40. The center plate 73 is positioned in parallel with the longitudinal direction of the refrigerant tube 45. The center plate 73 is positioned at a direct downstream side of the refrigerant tube 45, which is arranged at the center of the evaporator 40. An upstream end portion of the center plate 73 is close to the center refrigerant tube 45, or in contact with the center refrigerant tube 45 directly or indirectly via a cushion member. As a result, the center plate 73 divides a heat exchanging area of the evaporator 40 into two heat exchanging areas, each of which is respectively communicated with the air-flow passages in the temperature adjusting unit 72 divided by the center plates 73.

According to the present embodiment, seven cooling-storage containers 47 are respectively arranged on a right-hand side and on a left-hand side of the center plate 73 in the bilateral direction of arranging the refrigerant tubes 45. Namely, the same number of cooling-storage containers 47 are arranged on both sides of a center line of the evaporator 40, which is aligned with the center plate 73. Since each of the cooling-storage containers 47 has the same capacity for the cooling-storage material 50, the same quantity of the cooling-storage material 50 is arranged on both sides of the center line. Accordingly, difference of cooling-energy storing amounts or cooling-energy storing effect between the driver side and the passenger side is suppressed. For example, when radiating the stored cooling-energy, the temperature difference between the driver side and the passenger side can be suppressed.

Furthermore, the multiple cooling-storage containers 47 are symmetrically arranged with respect to the center plate 73. Therefore, the temperature difference between the driver side and the passenger side can be suppressed. In other words, a symmetric temperature distribution can be achieved by the air-mixing doors 75a and 75b, the heater cores 74a and 74b and the air duct units 76a and 76b, which are symmetrically arranged. Furthermore, in each of the air-flow passages, the multiple cooling-storage containers 47 are equally arranged, so that temperature distribution in the respective air-flow passages can be suppressed.

(Twelfth Embodiment)

Figure 24:
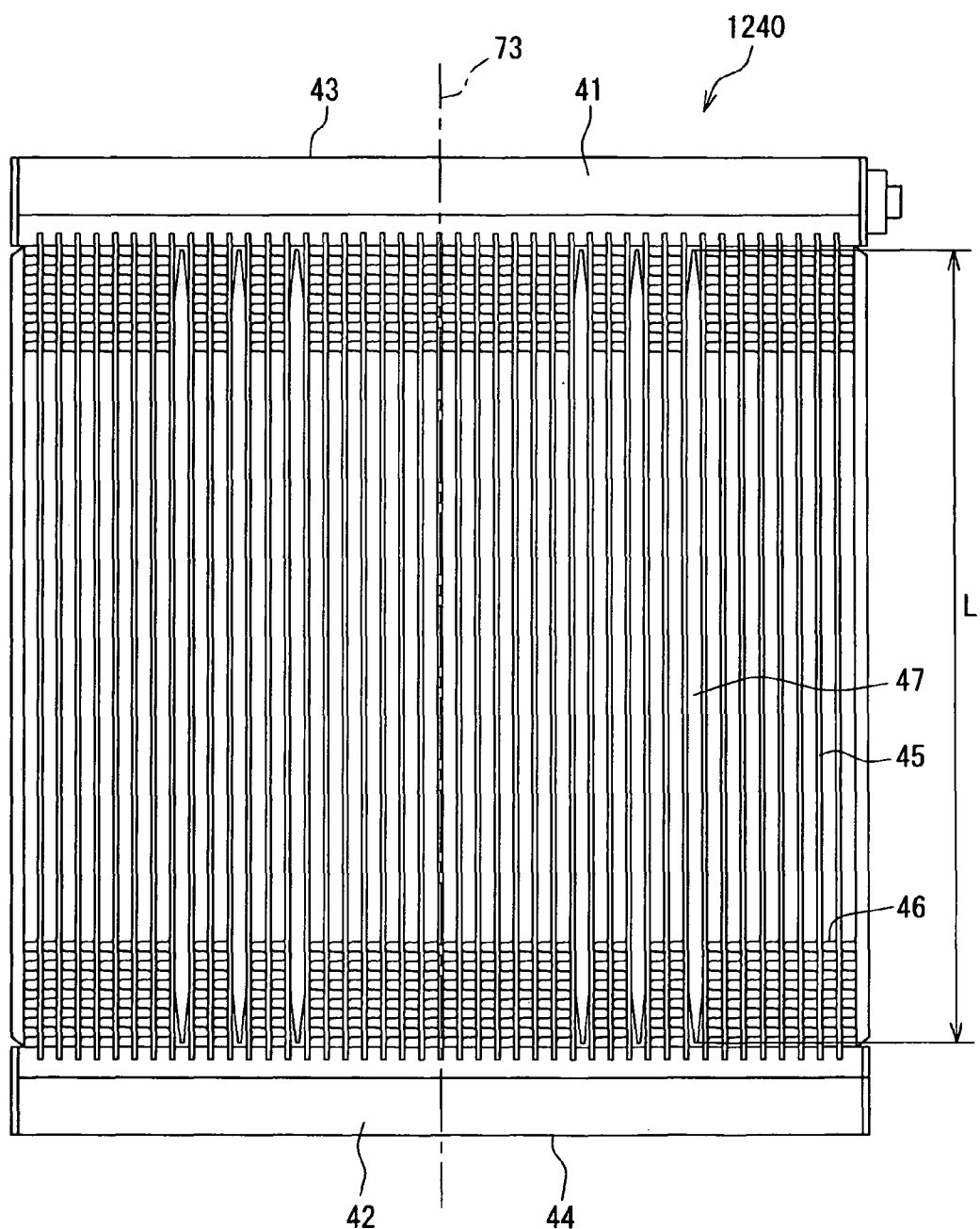
FIG. 24 is a plan view of a heat exchanger according to a twelfth embodiment.

FIG. 24 is a plan view showing an evaporator 1240 according to a twelfth embodiment. The same reference numerals to the above embodiments are used for those portions in this embodiment, which are the same to the above embodiments. The evaporator 1240 is applied to the air conditioning apparatus 70 of the above embodiment (FIG. 22).

The evaporator 1240 has respectively three cooling-storage containers 47 on the right-hand and left-hand sides of the center plate 73. Namely, the same number of cooling-storage containers 47 are arranged on both sides of the center plate 73 (the center line of the evaporator). Accordingly, the same quantity of the cooling-storage material 50 is arranged on both sides of the center plate 73. As a result, the temperature difference between the driver side and the passenger side can be suppressed.

In addition, the multiple cooling-storage containers 47 are symmetrically arranged with respect to the center plate 73. Accordingly, the difference of temperature distribution between the driver side and the passenger side can be suppressed. In other words, it is possible to provide a symmetrical temperature distribution.

In each of the heat exchanging areas of the evaporator 40, three cooling-storage containers 47 are so arranged that they are positioned close to a center of the respective air-flow passages. As a result, generation of an excessive temperature distribution is prevented in each of the air-flow passages. The evaporator 1240 may be applied to an air conditioning apparatus having a single air-flow passage without the center plate 73.

(Thirteenth Embodiment)

Figure 25:
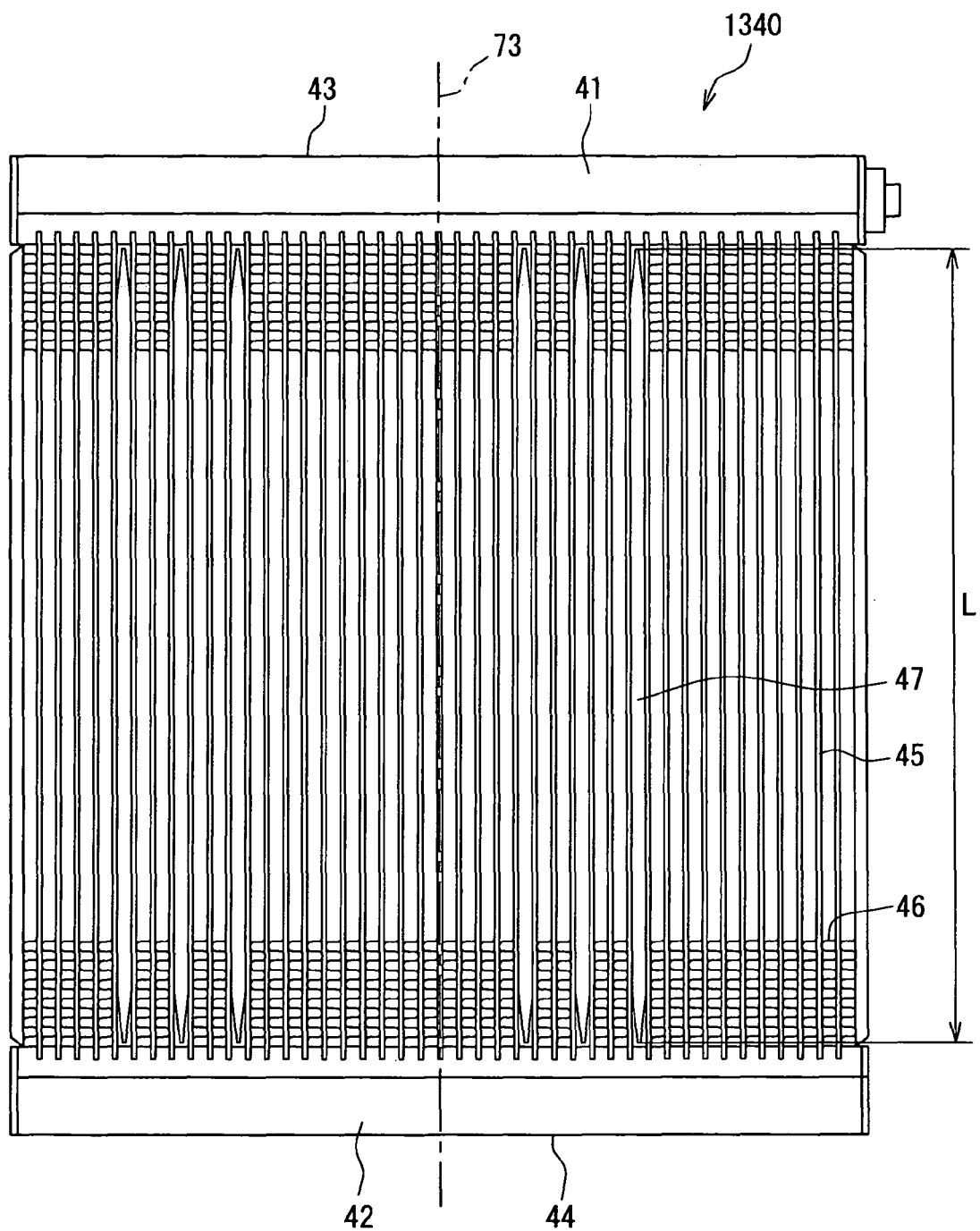
FIG. 25 is a plan view of a heat exchanger according to a thirteenth embodiment.

FIG. 25 is a plan view showing an evaporator 1340 according to a thirteenth embodiment. The same reference numerals to the above embodiments are used for those portions in this embodiment, which are the same to the above embodiments. The evaporator 1340 is applied to the air conditioning apparatus 70 of the above embodiment (FIG. 22).

The evaporator 1340 of FIG. 25 differs from the evaporator 1240 of FIG. 24, in that the cooling-storage containers 47 are not symmetrically arranged in FIG. 25. The evaporator 1340 has respectively three cooling-storage containers 47 on the right-hand and left-hand sides of the center plate 73. Namely, the same number of cooling-storage containers 47 are arranged on both sides of the center plate 73. Accordingly, the same quantity of the cooling-storage material 50 is arranged on both sides of the center plate 73. As a result, the temperature difference between the driver side and the passenger side can be suppressed.

The cooling-storage containers 47 are asymmetrically arranged with respect to the center plate 73. In each of the heat exchanging areas of the evaporator 40, three cooling-storage containers 47 are disproportionately arranged so that they are positioned at the left-hand side. The asymmetric arrangement of the cooling-storage containers provides an asymmetric temperature distribution. This kind of structure may be useful when it is necessary to apply to a special requirement depending on a demand of a disproportionate temperature distribution, which would result from a structure of the air conditioning apparatus 70. The evaporator 1340 may be applied to an air conditioning apparatus having a single air-flow passage without the center plate 73.

(Fourteenth Embodiment)

Figure 26:
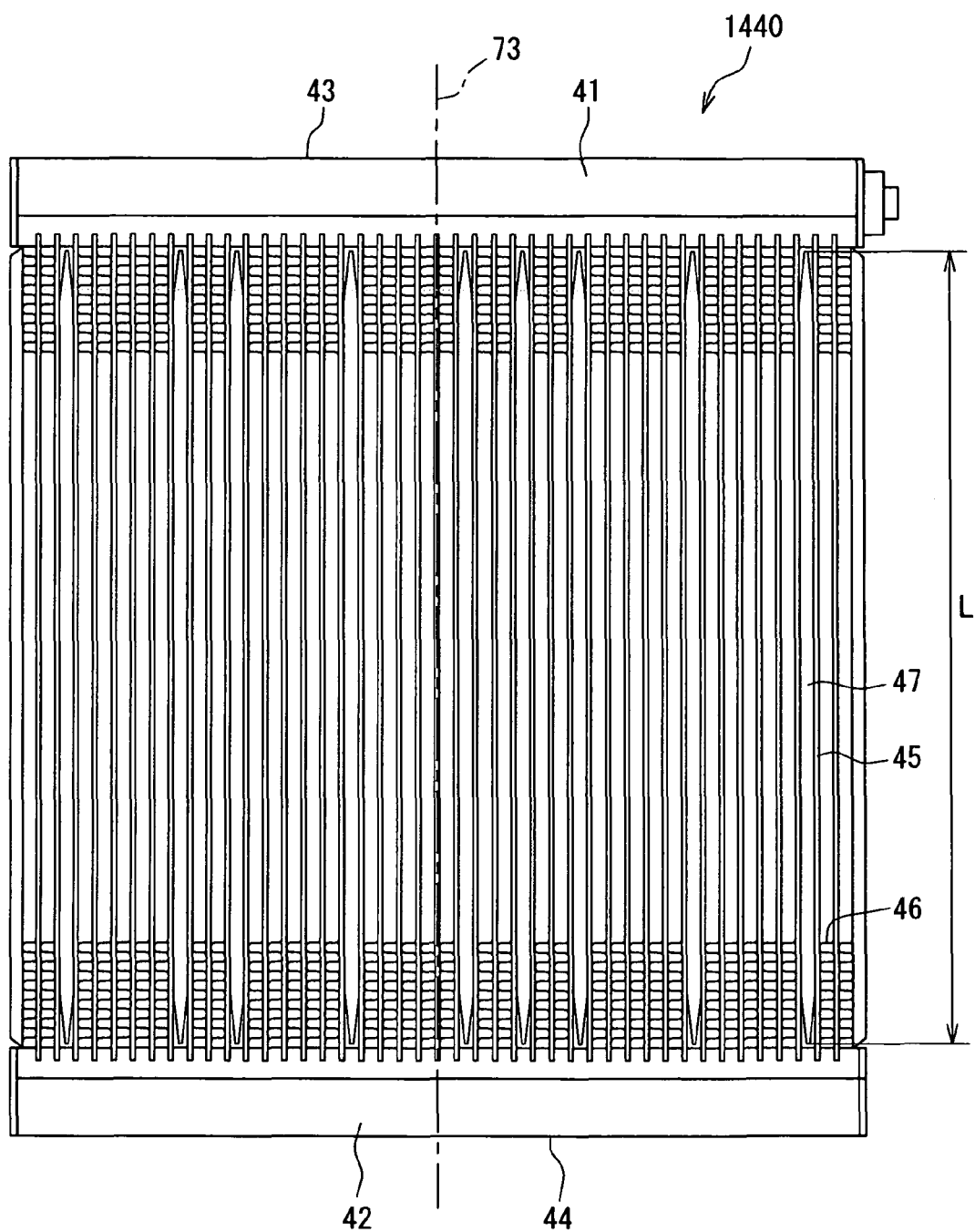
FIG. 26 is a plan view of a heat exchanger according to a fourteenth embodiment.

FIG. 26 is a plan view showing an evaporator 1440 according to a fourteenth embodiment. The same reference numerals to the above embodiments are used for those portions in this embodiment, which are the same to the above embodiments. The evaporator 1440 is applied to the air conditioning apparatus 70 of the above embodiment (FIG. 22).

The evaporator 1440 has five cooling-storage containers 47 on the right-hand side of the center plate 73 and four cooling-storage containers 47 on the left-hand side of the center plate 73. Namely, different number of cooling-storage containers 47 is arranged on the respective sides of the center plate 73. In other words, different quantity of the cooling-storage material 50 is arranged on the respective sides of the center plate 73. As a result, different effects for the cooling-energy storing operation are obtained for the driver side and the passenger side.

The cooling-storage containers 47 are asymmetrically arranged with respect to the center plate 73. In each of the heat exchanging areas of the evaporator 40, the cooling-storage containers 47 are disproportionately arranged so that more of the cooling-storage containers 47 are positioned at the left-hand side. The asymmetric arrangement of the cooling-storage containers provides an asymmetric temperature distribution. This kind of structure may be useful when it is necessary to apply to a special requirement depending on a demand of a disproportionate temperature distribution, which would result from a structure of the air conditioning apparatus 70. The evaporator 1440 may be applied to an air conditioning apparatus having a single air-flow passage without the center plate 73.

(Other Embodiments)

The present invention should not be limited to the above explained embodiments, but may be changed or modified in the following manners.

For example, the cooling-storage containers may occupy ½, ⅖, ¼, or ⅕ of the total accommodating spaces, which are formed between the neighboring refrigerant tubes 45.

The length L of the cooling-storage container 47 may be shorter than the length of the refrigerant tube 45 or the fin 46. In such a case, a short fin or any filling member may be inserted into a remaining space of the accommodating space between the refrigerant tubes.

In the case that the inner fin is arranged inside of the cooling-storage container, multiple openings may be formed at main wall portions in order that each of the top portions of the corrugate inner fin is inserted into the respective openings and the top portions may be directly in contact with the refrigerant tubes.

The refrigerant tubes may be formed by an extrusion process, or may be formed by bending plates having a plurality of dimples. The fin 46 may be removed. The heat exchanger of this kind (without fins) is called as a fin-less type heat exchanger. In stead of fins, a plurality of projections may be formed at outer surface portions of the refrigerant tubes in order to increase heat exchange with the air.

The present invention may be applied to evaporators having various refrigerant flows. For example, the present invention may be applied to an evaporator, in which the refrigerant flows not in a U-shape path on a front or back plane of the first and second heat exchanger portions but in a straight one-way path or in a U-shape path formed by the first and second heat exchanger portions on a plane in the direction of the air flow.

The present invention may be further applied to a refrigerating cycle for freezer storage, heating operation, or a hot-water supply apparatus.

What is claimed is:

1. A cool-storage type heat exchanger comprising:
   a first header tank and a second header tank;
   a plurality of refrigerant tubes arranged at distances and between the first and second header tanks, so that refrigerant flows through the refrigerant tubes from at least one of the first and second header tanks to the other one of the first and second header tanks;
   a first cooling-storage container arranged in a first container-accommodating space formed between neighboring first and second refrigerant tubes;
   a cooling-storage material inserted into an inside of the first cooling-storage container;

a heat transfer portion provided in the first cooling-storage container and projecting into the inside of the first cooling-storage container;

a first air-passage forming space formed between neighboring refrigerant tubes being composed of the first refrigerant tube and a third refrigerant tube;

a second air-passage forming space formed between neighboring refrigerant tubes being composed of the second refrigerant tube and a fourth refrigerant tube;

a third air-passage forming space formed between neighboring refrigerant tubes being composed of the fourth refrigerant tube and a fifth refrigerant tube; and a plurality of fins respectively provided in the first to the third air-passage forming spaces, wherein the first and second air-passage forming spaces are formed at both sides of the first cooling-storage container via the first and second refrigerant tubes, respectively, wherein the first, second, and third air-passage forming spaces are formed as air passages, through which air passes for heat exchanging with the refrigerant flowing through the refrigerant tubes, wherein a longitudinal length of the first cooling-storage container is smaller than a longitudinal distance between the first and the second header tanks, so that the first cooling-storage container is arranged between the first and the second header tanks in a longitudinal direction of the first cooling-storage container, wherein the first air-passage forming space is positioned along a first side of the first cooling-storage container, and the second air-passage forming space and the third air-passage forming space are positioned along a second side opposite to the first side of the first cooling-storage container, wherein the first refrigerant tube is positioned between the first cooling-storage container and the first air-passage forming space, and is directly secured to the first cooling-storage container and the fins provided in first air-passage forming space, wherein the second refrigerant tube is positioned between the first cooling-storage container and the second air-passage forming space and is directly secured to the first cooling-storage container and the fins provided in the second air-passage forming space, wherein the second refrigerant tube, the second air-passage forming space, and the fourth refrigerant tube are positioned directly between the first cooling-storage container and the third air-passage forming space along the second side of the first cooling-storage container, and wherein the fourth refrigerant tube is directly secured to the fins provided in the second air-passage forming space and the third air-passage forming space.

2. The cool-storage type heat exchanger according to claim 1, wherein
the refrigerant tubes are arranged at equal intervals, and
a width of the first cooling-storage container is substantially equal to that of each air passage.

3. The cool-storage type heat exchanger according to claim 1, further comprising:
a plurality of container-accommodating spaces including the first container-accommodating space;
a plurality of cooling-storage containers including the first cooling-storage container, each cooling-storage container being accommodated in each container-accommodating space; and
a plurality of air-passage forming spaces including the first, the second and the third air-passage forming spaces;
wherein a ratio of the cooling-storage containers occupying the container-accommodating spaces is between 10% to 50% with respect to a total space of the container-accommodating spaces and the air-passage forming spaces.

4. The cool-storage type heat exchanger according to claim 1, wherein
the cooling-storage container is composed of a pair of main wall portions and a plurality of partitioning portions, wherein each of the partitioning portions extends from one of the wall portions to an other of the wall portions.

5. The cool-storage type heat exchanger according to claim 1, wherein
the heat transfer portion is formed by an inner fin provided in the first cooling-storage container.

6. The cool-storage type heat exchanger according to claim 1, wherein
the heat transfer portion is formed by projections, each projection projecting from one of the wall portions of the cooling-storage container toward an other of the wall portions.

7. The cool-storage type heat exchanger according to claim 1, further comprising:
a plurality of container-accommodating spaces including the first container-accommodating space; and
a plurality of cooling-storage containers, including the first cooling-storage container,
wherein each of the cooling-storage containers is arranged in a respective one of the container-accommodating spaces formed between neighboring refrigerant tubes, and the cooling-storage containers are arranged at equal intervals.

8. The cool-storage type heat exchanger according to claim 1, further comprising:
a plurality of container-accommodating spaces including the first container-accommodating space; and
a plurality of cooling-storage containers, including the first cooling-storage container,
wherein each of the cooling-storage containers is arranged in a respective one of the container-accommodating spaces formed between neighboring refrigerant tubes, and the cooling-storage containers are equally arranged on right and left sides of the heat exchanger with respect to a center thereof.

9. The cool-storage type heat exchanger according to claim 8, wherein
the cooling-storage containers are symmetrically arranged with respect to the center of the heat exchanger.

10. The cool-storage type heat exchanger according to claim 1, wherein
a heat exchanging area, which is formed by the refrigerant tubes, the cooling-storage container and the air passages, communicates with a single air-flow passage formed in an air conditioning case at a downstream side of the heat exchanger.

11. The cool-storage type heat exchanger according to claim 1, wherein
a heat exchanging area, which is formed by the refrigerant tubes, the cooling-storage container and the air passages, is divided into two heat exchanging areas, and
each of the heat exchanging areas communicates with respective air-flow passages formed in an air conditioning case at a downstream side of the heat exchanger.

12. The cool-storage type heat exchanger according to claim 1, wherein
the heat exchanger comprises two-layered first and second heat exchanger portions, a first cooling-storage container and two refrigerant tubes arranged at both sides of the first cooling-storage container form a first cooling-storage unit, which is arranged in the first heat exchanger portion, a second cooling-storage container and two refrigerant tubes arranged at both sides of the second cooling-storage container form a second cooling-storage unit, which is arranged in the second heat exchanger portion, the first and second cooling-storage units are aligned with each other in a direction of air flow passing through the heat exchanger, and the first and second cooling-storage units are separated from each other to form therebetween a space working as a heat insulator.

13. The cool-storage type heat exchanger according to claim 1, wherein the heat exchanger comprises two-layered first and second heat exchanger portions, a first cooling-storage container and two refrigerant tubes arranged at both sides of the first cooling-storage container form a first cooling-storage unit, which is arranged in the first heat exchanger portion, a second cooling-storage container and two refrigerant tubes arranged at both sides of the second cooling-storage container form a second cooling-storage unit, which is arranged in the second heat exchanger portion, the first and second cooling-storage units are aligned with each other in a direction of air flow passing through the heat exchanger, and the first and second cooling-storage units are connected with each other by means of a partitioning wall or a restricted portion, which works as a heat insulator.

14. The cool-storage type heat exchanger according to claim 1, wherein the cool-storage type heat exchanger is formed in a two-layered structure having a first layer portion and a second layer portion, the first layer portion being composed of a first heat exchanger portion and the second layer portion being composed of a second heat exchanger portion, the first heat exchanger portions has a first and a second header tanks connected at both ends of the refrigerant tubes, wherein the first header tank is divided into a first and a second header portions by a partition provided inside of the first header tank, so that the refrigerant flows in a U-shape path from the first header portion of the first header tank to the second header portion of the first header tank through a first tube group of the refrigerant tubes, the second header tank and a second tube group of the refrigerant tubes, the second heat exchanger portions has a third and a fourth header tanks connected at both ends of the refrigerant tubes, wherein the third header tank is divided into a first and a second header portions by a partition provided inside of the third header tank, the first header portion of the third header tank is communicated with the second header portion of the first header tank, so that the refrigerant flows in a U-shape path from the first header portion of the third header tank to the second header portion of the third header tank through a first tube group of the refrigerant tubes, the fourth header tank and a second tube group of the refrigerant tubes.

15. The cool-storage type heat exchanger according to claim 1, further comprising:

a second cooling-storage container, which is arranged in a second container-accommodating space formed between neighboring refrigerant tubes other than the first to fourth refrigerant tubes, wherein the second cooling-storage container is formed as an independent container from the first cooling-storage container.

16. The cool-storage type heat exchanger according to claim 1, wherein each of the first and second refrigerant tubes has a first side surface attached to the first cooling-storage container and a second side surface attached to the fin provided in each of the first and second air-passage forming spaces, each of the third and fourth refrigerant tubes has a first side surface attached to the fin provided in each of the first and second air-passage forming spaces, and each of the third and fourth refrigerant tubes has a second side surface attached to the fin provided in each of third and fourth air-passage forming spaces, which are respectively formed next to the first and second air-passage forming spaces.

17. The cool-storage type heat exchanger of claim 1 comprising:

a second cooling-storage container located on the second side of the first cooling-storage container; and a second cooling-storage material located in the second cooling-storage container, wherein;

the first cooling-storage container and the second cooling-storage container are coupled to each other by way of the second air-passage forming space, the third air-passage forming space, the second refrigerant tube, the fourth refrigerant tube, and the fifth refrigerant tube, and the fifth refrigerant tube is positioned between and is directly secured to the fins provided in the third air-passage forming space and the second cooling-storage container.

18. The cool-storage type heat exchanger of claim 17, wherein:

the second refrigerant tube, the second air-passage forming space, the fourth refrigerant tube, the third air-passage forming space, and the fifth refrigerant tube are arranged in this order between the first cooling-storage container and the second cooling-storage container, and the second refrigerant tube, the second air-passage forming space, the fourth refrigerant tube, the third air-passage forming space, and the fifth refrigerant tube are formed as one integral unit.

19. The cool-storage type heat exchanger of claim 1, wherein:

the first cooling-storage container, the refrigerant tubes, and the fins provided in each of the air-passage forming spaces are connected to one another by bonding material.

20. A cool-storage type heat exchanger comprising:

a first and a second header tanks;

a plurality of refrigerant tubes arranged at distances and between the first and second header tanks, so that refrigerant flows through the refrigerant tubes from at least one of the first and second header tanks to the other one of the first and second header tanks, wherein a container-accommodating space is formed between neighboring first and second refrigerant tubes, and a first and a second air-passage forming spaces are respectively formed at both sides of the container-accommodating space, so that the first air-passage forming space is formed between the first refrigerant tube and a third refrigerant tube and the second air-passage forming space is formed between the second refrigerant tube and a fourth refrigerant tube, wherein a third air-passage forming space is formed between neighboring refrigerant tubes being composed of the fourth refrigerant tube and a fifth refrigerant tube;

a plurality of fins respectively provided in the first to the third air-passage forming spaces, so that the fins provided in the second and third air-passage forming spaces are in direct contact with the fourth refrigerant tube at both sides of the fourth refrigerant tube;

a cooling-storage container arranged in the container-accommodating space;

a cooling-storage material inserted into an inside of the cooling-storage container; and a heat transfer portion provided in the cooling-storage container and projecting into the inside of the cooling-storage container, wherein:

the first, the second, and the third air-passage forming spaces are formed as air passages, through which air passes for heat exchanging with the refrigerant flowing through the refrigerant tubes, the refrigerant tubes are arranged at equal intervals, a width of the cooling-storage container is substantially equal to that of each air passage, the first air-passage forming space is positioned along a first side of the cooling-storage container, and the second air-passage forming space and the third air-passage forming space are positioned along a second side opposite to the first side of the cooling-storage container, the first refrigerant tube is positioned between the cooling-storage container and the first air-passage forming space, and is directly secured to the cooling-storage container and the fins provided in first air-passage forming space, the second refrigerant tube is positioned between the cooling-storage container and the second air-passage forming space and is directly secured to the cooling-storage container and the fins provided in the second air-passage forming space, the second refrigerant tube, the second air-passage forming space, and the fourth refrigerant tube are positioned directly between the cooling-storage container and the third air-passage forming space along the second side of the cooling-storage container, and the fourth refrigerant tube is directly secured to the fins provided in the second air-passage forming space and the third air-passage forming space.

21. The cool-storage type heat exchanger of claim 20, wherein:
the cooling-storage container, the refrigerant tubes, and the fins provided in each of the air-passage forming spaces are connected to one another by bonding material.

22. A cool-storage type heat exchanger comprising:
a first header tank;
a second header tank;
a plurality of tubes disposed between said first and second header tanks, each of said plurality of tubes being in fluid communication with said first and second header tanks;
a cooling-storage container disposed between at least a first pair of adjacent tubes, said cooling-storage container extending continuously from one tube of said first pair of adjacent tubes to the other tube of said first pair of adjacent tubes;
a cooling-storage material disposed within said cooling-storage container;
a first air passage disposed adjacent to the one tube of the first pair of adjacent tubes at a side opposite to the cooling-storage container;
a second air passage disposed adjacent to the other tube of the first pair of adjacent tubes at a side opposite to the cooling-storage container;
a second pair of adjacent tubes disposed adjacent to the second air passage at a side of the second air passage opposite to the first pair of tubes;
a third air passage formed between the second pair of tubes;
a first fin disposed in the first air passage, wherein the first fin is directly secured to the tubes at both sides of the first fin;
a second fin disposed in the second air passage, wherein the second fin is directly secured to the tubes at both sides of the second fin;
a third fin disposed in the third air passage, wherein the third fin is directly secured to the tubes at both sides of the third fin, the third fin extending continuously from one tube of said second pair of adjacent tubes to the other tube of said second pair of adjacent tubes, wherein:
the cooling-storage container is directly secured to the first pair of adjacent tubes at both sides of the cooling-storage container,
the first air passage is positioned along a first side of the cooling-storage container, and the second air passage and the third air passage are positioned along a second side opposite to the first side of the cooling-storage container,
the one tube of the first pair of adjacent tubes is positioned between the cooling-storage container and the first air passage, and is directly secured to the cooling-storage container and the first fin provided in the first air passage,
the other tube of the first pair of adjacent tubes is positioned between the cooling-storage container and the second air passage and is directly secured to the cooling-storage container and the fins provided in the second air passage,
the other tube of the first pair of adjacent tubes, the second air passage, and the one tube of the second pair of adjacent tubes are positioned directly between the cooling-storage container and the third air passage along the second side of the cooling-storage container, and
the one tube of the second pair of adjacent tubes is directly secured to the fins provided in the second air passage and the third air passage.

23. The cool-storage type heat exchanger of claim 22, wherein:
the cooling-storage container, the tubes, and the fins provided in each of the air passages are connected to one another by bonding material.

24. A cool-storage type heat exchanger comprising:
a first header tank and a second header tank extending in a width direction;
a plurality of refrigerant tubes disposed between the first and second header tanks, each of the plurality of refrigerant tubes being in direct fluid communication with the first and second header tanks;
a plurality of cooling-storage containers disposed between the first and second header tanks;
a cooling-storage material being disposed inside each of the plurality of cooling-storage containers;
a plurality of air passages disposed between the first and second header tanks;
a plurality of fins, each of which is disposed in a respective air passage; wherein
the plurality of refrigerant tubes, the plurality of cooling-storage containers, and the plurality of air passages extend between the first and second header tanks in a longitudinal direction perpendicular to the width direction;

a stacking sequence of the plurality of refrigerant tubes, the plurality of cooling-storage containers, the plurality of air passages, and the plurality of fins in the width direction includes a first air-passage provided with a first fin, a first refrigerant tube immediately adjacent to the first air-passage and directly secured to the first fin provided with the first air-passage, a first cooling-storage container directly secured to the first refrigerant tube, a second refrigerant tube directly secured to the first cooling-storage container, a second air-passage provided with a second fin and immediately adjacent to the second refrigerant tube and directly secured to the second refrigerant tube via the second fin provided with the second air-passage, and a third refrigerant tube immediately adjacent to the second air-passage and directly secured to second fin provided with the second air-passage in this specific order; and the stacking sequence is repeated for a total of at least two stacking sequences in the width direction, so that the third refrigerant tube is disposed between and is directly secured to the second air passage provided with the second fin of a first unit for the cooling-storage container having the stacking sequence and the first air passage provided with the first fin of a second unit for the cooling-storage container having the stacking sequence, and the second refrigerant tube, the second air-passage, and the third refrigerant tube are positioned directly between the first cooling-storage container and the first air passage of the second unit for the cooling-storage container having the stacking sequence, wherein the second unit for the cooling-storage container is directly secured to the first unit for the cooling-storage container.

25. The cool-storage type heat exchanger of claim 24, wherein:

the cooling-storage containers, the refrigerant tubes, and the fins provided in each of the air passages are connected to one another by bonding material.

26. A cool-storage type heat exchanger comprising:

a first and a second header tanks;

a plurality of refrigerant tubes arranged at distances from each other and between the first and second header tanks, so that refrigerant flows through the refrigerant tubes at least from one of the first and second header tanks to the other one of the first and second header tanks, wherein the refrigerant tubes are composed of multiple tube units, each of which has a first refrigerant tube, a second refrigerant tube, a third refrigerant tube, and a fourth refrigerant tube, wherein the first to the fourth refrigerant tubes are arranged in an order of the third refrigerant tube, the first refrigerant tube, the second refrigerant tube, and the fourth refrigerant tube, and wherein the multiple tube units are arranged in series so that the fourth refrigerant tube of one tube unit corresponds to the third refrigerant tube of another tube unit next to the one tube unit;

a cooling-storage container arranged in an accommodating space formed between the first and the second refrigerant tubes, wherein each of the side surfaces of the cooling-storage container is thermally connected and attached to outer surfaces of the first and the second refrigerant tubes, cooling-storage material inserted into an inside of the cooling-storage container;

a plurality of air passages, each of which is formed between the third and first refrigerant tubes and between the second and fourth refrigerant tubes, wherein each of the air passages is arranged at both sides of the cooling-storage container via the first and the second refrigerant tubes; and a plurality of heat-transfer members arranged in each of the air passages so as to transfer heat from the refrigerant flowing through the refrigerant tubes to the air passing through the air passages, wherein each of the heat-transfer members is directly secured to the respective refrigerant tubes and wherein the heat-transfer members are arranged at both sides of the third refrigerant tube and the fourth refrigerant tube in a condition that the multiple tube units are arranged in series, so that each of the heat-transfer members is thermally connected to the cooling-storage container via the first and second refrigerant tubes, wherein:

a first air passage is disposed on a first side of the cooling-storage container and a second air passage and a third air passage are positioned on a second side opposite to first side of the cooling-storage container, and the first air passage, the second air passage, and the third air passage are among the plurality of air passages, a first heat-transfer member, a second heat-transfer member, and a third heat-transfer member are arranged in the first air passage, the second air passage, and the third air passage, respectively, and the first heat-transfer member, the second heat-transfer member, and the third heat-transfer member are among the plurality of heat-transfer members, the first refrigerant tube of a first tube unit is positioned between the cooling-storage container and the first air passage, and is directly secured to the cooling-storage container and the first heat-transfer member provided in first air passage forming space, the second refrigerant tube of the first tube unit is positioned between the cooling-storage container and the second air passage and is directly secured to the cooling-storage container and the second heat-transfer member provided in the second air passage, the fourth refrigerant tube of the first tube unit is directly secured to the second heat-transfer member provided in the second air passage and the third heat-transfer member provided in the third air passage, the second refrigerant tube, the second air passage, and the fourth refrigerant tube are positioned directly between the cooling-storage container and the third air passage along the second side of the cooling-storage container, and the fourth refrigerant tube of the first tube unit is provided as the third refrigerant tube of a second tube unit, so that the third heat-transfer member provided in the third air passage is disposed between and is directly secured to the fourth refrigerant tube of the first tube unit, as the third refrigerant tube of the second tube unit, and the first refrigerant tube of the second tube unit.

27. The cool-storage type heat exchanger of claim 26, wherein:

the cooling-storage container, the refrigerant tubes, and the heat-transfer members provided in each of the air passages are connected to one another by bonding material.

28. An air-conditioning apparatus for a vehicle comprising:

a compressor operated by a power source for driving the vehicle so as to compress and discharge refrigerant of the air-conditioning apparatus;

a condenser for cooling down the refrigerant of high temperature discharged from the compressor;

a depressurizing device for depressurizing cooled-down refrigerant; and a cool-storage type heat exchanger for evaporating the refrigerant so that air blown into a passenger compartment of the vehicle is cooled down, wherein the cool-storage heat exchanger comprises:

a plurality of refrigerant tubes arranged at distances, so that the refrigerant flows through the refrigerant tubes, the refrigerant tubes being composed of a first refrigerant tube, a second refrigerant tube, a third refrigerant tube, a fourth refrigerant tube, and a fifth refrigerant tube, wherein the refrigerant tubes are arranged in an order of the third refrigerant tube, the first refrigerant tube, the second refrigerant tube, the fourth refrigerant tube, and the fifth refrigerant tube;

a first cooling-storage container arranged in a first container-accommodating space formed between the first and second refrigerant tubes and directly secured to the first and second refrigerant tubes at both sides of the first cooling-storage container;

a cooling-storage material inserted into an inside of the first cooling-storage container;

a first air-passage forming space formed between the first refrigerant tube and the third refrigerant tube;

a second air-passage forming space formed between the second refrigerant tube and the fourth refrigerant tube;

a third air-passage forming space formed between the fourth refrigerant tube and the fifth refrigerant tube; and a plurality of fins respectively provided in the first to the third air-passage forming spaces, so that the fins provided in the second and third air-passage forming spaces are directly secured to the fourth refrigerant tube at both sides of the fourth refrigerant tube, wherein:

the first and second air-passage forming spaces are formed at both sides of the first cooling-storage container via the first and second refrigerant tubes, respectively, the first, the second, and the third air-passage forming spaces are formed as air passages through which the air passes for heat exchanging with the refrigerant flowing through the refrigerant tubes, the first air-passage forming space is positioned along a first side of the first cooling-storage container, and the second air-passage forming space and the third air-passage forming space are positioned along a second side opposite of the first side of the first cooling-storage container, the first refrigerant tube is positioned between the first cooling-storage container and the first air-passage forming space, and is directly secured to the first cooling-storage container and the fins provided in the first air-passage forming space, the second refrigerant tube is positioned between the first cooling-storage container and the second air-passage forming space and is directly secured to the first cooling-storage container and the fins provided in the second air-passage forming space, the second refrigerant tube, the second air-passage forming space, and the fourth refrigerant tube are positioned directly between the first cooling-storage container and the third air-passage forming space along the second side of the first cooling-storage container, the fourth refrigerant tube is directly secured to the fins provided in the second air-passage forming space and the third air-passage forming space, the refrigerant is evaporated to thereby cool down the air to be blown into the passenger compartment as well as the cooling-storage material contained in the first cooling-storage container when the compressor is operated, and cold energy of the cooling-storage material is radiated to the air to be blown into the passenger compartment when the compressor is not operated.

29. The cool-storage type heat exchanger of claim 28, wherein:

the first cooling-storage container, the refrigerant tubes, and the fins provided in each of the air-passage forming spaces are connected to one another by bonding material.

\* \* \* \* \*